US006843968B2

(12) United States Patent
Kagawa

(10) Patent No.: US 6,843,968 B2
(45) Date of Patent: Jan. 18, 2005

(54) METHOD OF MANUFACTURING LIQUID MEDIUM CONTAINING COMPOSITE ULTRAFINE PARTICLES AND APPARATUS THEREOF

(76) Inventor: Seiji Kagawa, 1-252-1-304, Akayamacho, Koshigaya-shi, Saitama-ken (JP)

( * ) Notice: Subject to any disclaimer, the term of this patent is extended or adjusted under 35 U.S.C. 154(b) by 284 days.

(21) Appl. No.: 09/962,338

(22) Filed: Sep. 26, 2001

(65) Prior Publication Data

US 2002/0045682 A1 Apr. 18, 2002

(30) Foreign Application Priority Data

Sep. 29, 2000 (JP) ....................................... 2000-301141

(51) Int. Cl.[7] .......................... B01J 19/08; B01F 13/00; B05B 5/025

(52) U.S. Cl. ............... 422/186.04; 239/690; 366/167.1; 366/174.1

(58) Field of Search ........................... 366/167.1, 173.1, 366/173.2, 174.1, 175.2; 422/186.04, 186; 239/697, 186, 3, 790, 690, 690.1, 705, 706, 707

(56) References Cited

U.S. PATENT DOCUMENTS 3,131,131 A 4/1964 Wehner
3,775,058 A * 11/1973 Bush ........................... 436/51
4,034,966 A 7/1977 Suh et al.
4,341,347 A * 7/1982 DeVittorio ..................... 239/3
4,735,364 A * 4/1988 Marchant ................. 239/690.1
5,086,972 A * 2/1992 Chang et al. .................. 239/3
5,658,535 A * 8/1997 Thayer, III ................. 422/129
5,704,554 A * 1/1998 Cooper et al. ........... 239/690.1
5,915,377 A 6/1999 Coffee
5,921,678 A 7/1999 Desai et al.
6,193,936 B1 * 2/2001 Gardner et al. ............. 422/186
6,200,013 B1 * 3/2001 Takeuchi et al. ......... 366/167.1
6,302,331 B1 * 10/2001 Dvorsky et al. ......... 239/690.1
6,331,290 B1 * 12/2001 Morgan ....................... 424/46

FOREIGN PATENT DOCUMENTS

| | | |
|---|---|---|
| EP | 0 335 188 | 3/1989 |
| EP | 0 913 187 | 5/1999 |
| GB | 543995 | 3/1942 |
| GB | 731815 | 6/1955 |
| JP | 10131786 A | 5/1998 |

* cited by examiner

*Primary Examiner*—Tony G. Soohoo
(74) *Attorney, Agent, or Firm*—Nixon & Vanderhye P.C.

(57) ABSTRACT

A method of manufacturing a liquid medium containing composite ultrafine particles comprises the steps of preparing a dispersion medium that is a liquid medium in which ultrafine particles of different materials from each other are dispersed, introducing the dispersion medium into first and second chambers, respectively, applying high frequency voltage to the chambers and exciting dispersion media, applying direct current voltage to each dispersion medium on the downstream side than the applying position of the high frequency voltage and electrifying these in different polarities from each other, and aggregating/bonding by means of excitation transfer as well as electrostatically aggregating ultrafine particles each other in the liquid medium in the crashing field by injecting the dispersion media electrified in different polarities from each other through two nozzle sections at a high speed, and crossing/crashing each other.

25 Claims, 7 Drawing Sheets

METHOD OF MANUFACTURING LIQUID MEDIUM CONTAINING COMPOSITE ULTRAFINE PARTICLES AND APPARATUS THEREOF

CROSS-REFERENCE TO RELATED APPLICATIONS

This application is based upon and claims the benefit of priority from the prior Japanese Patent Application No. 2000-301141, filed Sep. 29, 2000, the entire contents of which are incorporated herein by reference.

BACKGROUND OF THE INVENTION

1. Field of the Invention

The present invention relates to a method of manufacturing a liquid medium containing composite ultrafine particles and manufacturing apparatus thereof.

2. Description of the Related Art

Recently, ultrafine particles whose diameter is a submicron or less and which comprises at least one material selected from organic polymers, metals and inorganic compounds suitable for a material having a high functionality and a material having a high grade physical property have been developed. Particularly, composite ultrafine particles in which different kinds of organic polymers are uniformly aggregated, this is, composite ultrafine particles in which at least one ultrafine particle whose size is on the order of nano level selected from organic polymers, metals and inorganic compounds are uniformly aggregated and bonded have been noted.

A liquid medium containing these composite ultrafine particles (e.g., a composite ultrafine particle of organic polymer and inorganic compound) is conventionally manufactured by the following method: by employing a breaking and dispersing device equipped with a main body having two nozzle sections, a solid-liquid mixed fluid that is a liquid medium into which the desired amounts of organic polymer and inorganic compound fine particles are mixed is introduced into the main body with a high pressure, and a composite ultrafine particle is manufactured by forcing the two nozzle sections to inject the solid-liquid mixed fluid at a high speed and cross/crash the fluid each other.

In a method using breaking and dispersing device described above, it is possible to break and disperse the organic polymer and inorganic compound particles into a state of being ultrafine particles. However, it was difficult to manufacture a composite ultrafine particle such that inorganic compound ultrafine particles of nano level are uniformly dispersed and aggregated into an organic polymer.

The present invention provides a method that composite ultrafine particles in which different organic polymers are uniformly aggregated and a liquid medium containing composite ultrafine particles in which at least one ultrafine particle of the order of nano level selected from metal and inorganic compound is uniformly dispersed and bonded are capable of being manufactured easily and in a large quantity, and manufacturing apparatus thereof.

BRIEF SUMMARY OF THE INVENTION

According to the present invention, there is provided a method of manufacturing a liquid medium containing composite ultrafine particles comprising the steps of:

preparing a dispersion medium that is a liquid medium in which ultrafine particles comprising different materials from each other are dispersed introducing the dispersion medium into a first chamber and a second chamber having an inlet/outlet with a high pressure, respectively;

applying high frequency voltage to the first and second chambers, respectively, exciting dispersion medium communicating within the first and second chambers, respectively;

applying direct current voltage to each excited dispersion medium on the downstream side than the application position of the high frequency voltage and electrifying each dispersion medium in different polarities from each other; and aggregating and bonding through excitation transfer as well as electrostatically aggregating ultrafine particles each other in the liquid medium in its crashing field by injecting the dispersion medium electrified in different polarities from each other through two nozzle sections electrically separated from each other at a high speed, respectively, and crossing/crashing each other.

Moreover, according to the present invention, there is provided a method of manufacturing a liquid medium containing composite ultrafine particles comprising the steps:

preparing a first dispersion medium in which ultrafine particles comprising at least one material selected from organic polymers, metals and inorganic compounds are dispersed;

preparing a second dispersion medium that is a liquid medium in which at least one kind of organic polymer ultrafine particles are dispersed;

introducing the first and second dispersion media into first and second chambers having an inlet/outlet, respectively;

applying high frequency voltage to the first and second chambers, respectively, exciting the first and second dispersion media communicating within the first and second chambers, respectively;

applying direct current voltage to the first and second dispersion media on the downstream side than the application position of the high frequency voltage and electrifying each dispersion medium in different polarities from each other; and aggregating and bonding through excitation transfer as well as electrostatically aggregating ultrafine particles each other in the first and second dispersion media in its crashing field by injecting the first and second dispersion media electrified in different polarities from each other through two nozzle sections electrically separated from each other at a high speed, respectively, and crossing/crashing each other.

Furthermore, according to the present invention, there is provided a manufacturing apparatus of a liquid medium containing composite ultrafine particles comprising:

a first chamber having an inlet/outlet in which a dispersion medium is introduced, and the dispersion medium consisting of a liquid medium in which ultrafine particles of different materials from each other are dispersed;

a second chamber having an inlet/outlet in which the dispersion medium is introduced;

an aggregating/bonding means having two nozzle section electrically separated each other for introducing the dispersion medium communicating within the first and second chambers, injecting these dispersion media and crossing/crashing each other;

a high frequency source for applying a high frequency voltage to the dispersion medium communicating within the first and second chambers through an insulating member that high frequency is capable of being transmitted; and a direct current source connected to a member located up to the nozzle section on the downstream side in a flow direction of the dispersion medium than the application position of the high frequency voltage.

Still furthermore, according to the present invention, there is provided a manufacturing apparatus of a liquid medium containing composite ultrafine particles comprising:

first dispersion medium preparation means for preparing a first dispersion medium that is a liquid medium in which ultrafine particles comprising at least one material selected from organic polymers, metals and inorganic materials are dispersed;

second dispersion medium preparation means for preparing a second dispersion medium that is a liquid medium in which at least one of organic polymer ultrafine particles is dispersed;

a first chamber having an inlet/outlet in which the pressurized first dispersion medium is introduced from the first dispersion medium preparation means;

a second chamber having an inlet/outlet in which the pressurized second dispersion medium is introduced from the second dispersion medium preparation means;

an aggregating/bonding means having two nozzle sections electrically separated from each other for introducing the first and second dispersion media communicating with the first and second chambers, respectively, and injecting these dispersion media and crossing/crashing each other;

a high frequency source for applying a high frequency voltage to each dispersion medium communicating within the first and second chambers through an insulating member through which high frequency is capable of being transmitted; and a direct current source connected to a member located up to the nozzle section on the downstream side in a flow direction of the first and second dispersion media than the application position of the high frequency voltage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the embodiment given below, serve to explain the principles of the invention.

DETAILED DESCRIPTION OF THE INVENTION

Hereinafter, a method of manufacturing a liquid medium containing composite ultrafine particles and its manufacturing apparatus according to the present invention will be described in detail with reference to the accompanying drawings.

(First Embodiment)

Figure 1:
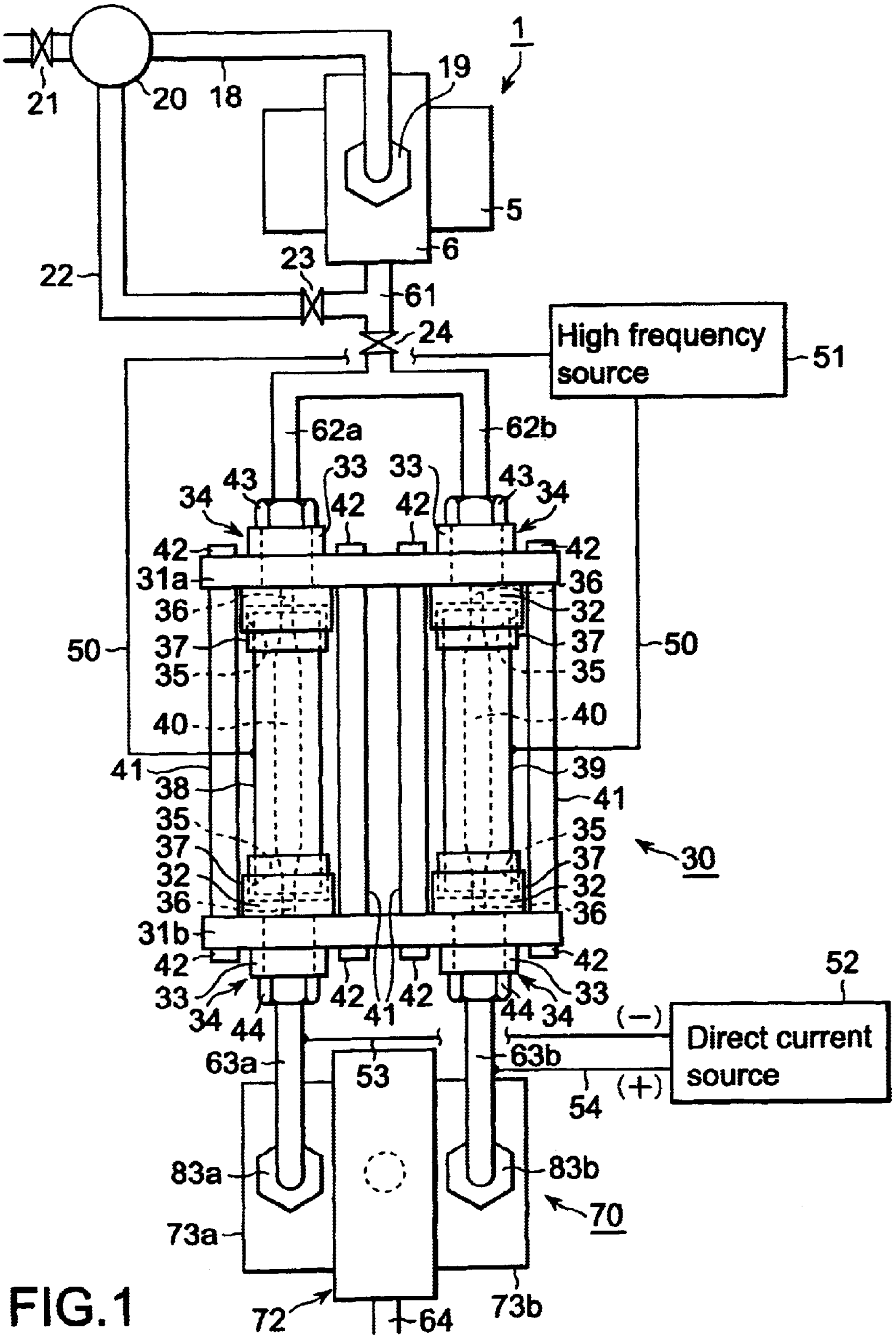
FIG. 1 is a top view schematically showing a manufacturing apparatus of a composite ultrafine particle according to the first embodiment of the present invention.
Figure 2:
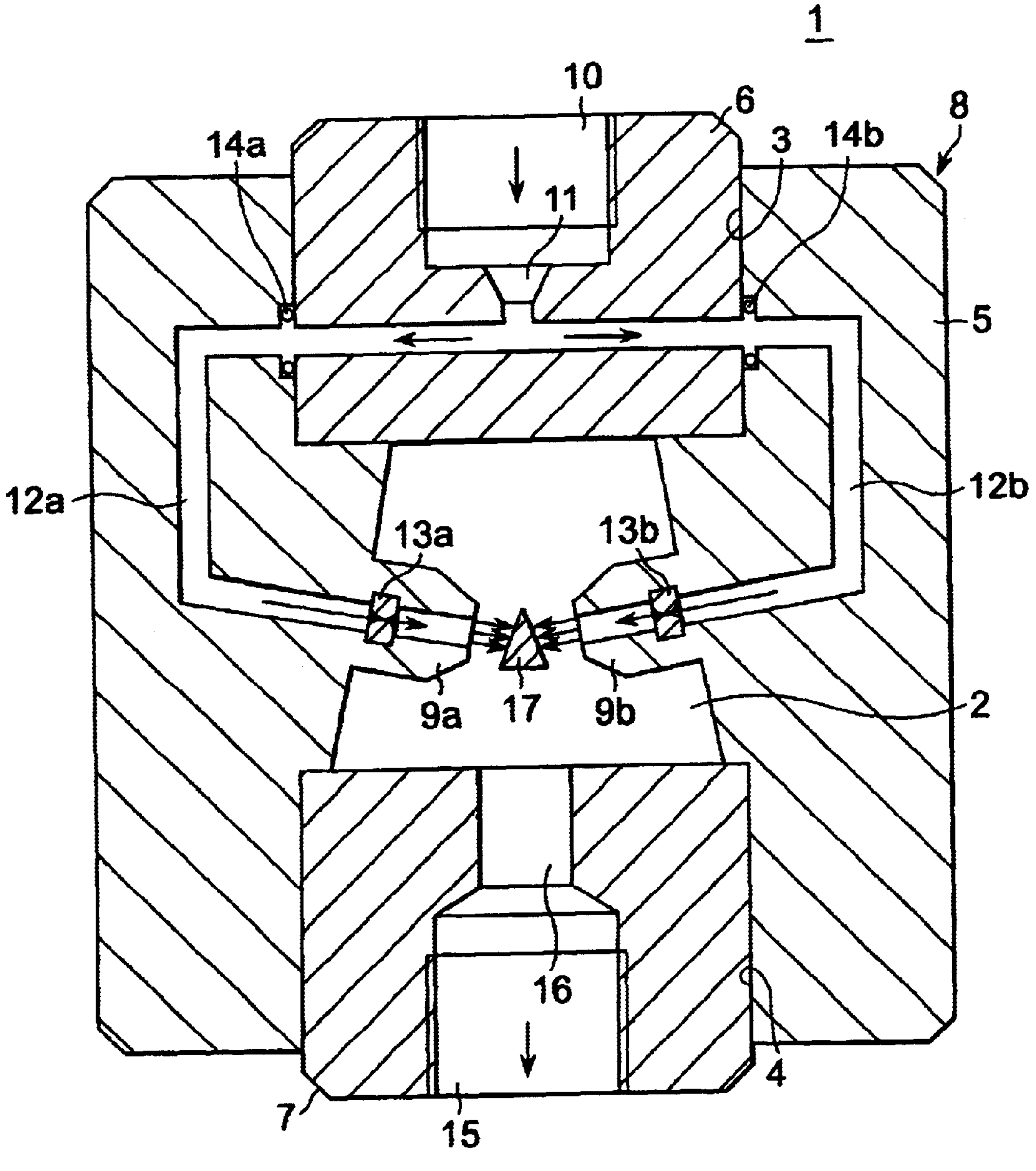
FIG. 2 is a sectional view showing the dispersion medium preparation mechanism incorporated in FIG. 1.
Figure 3:
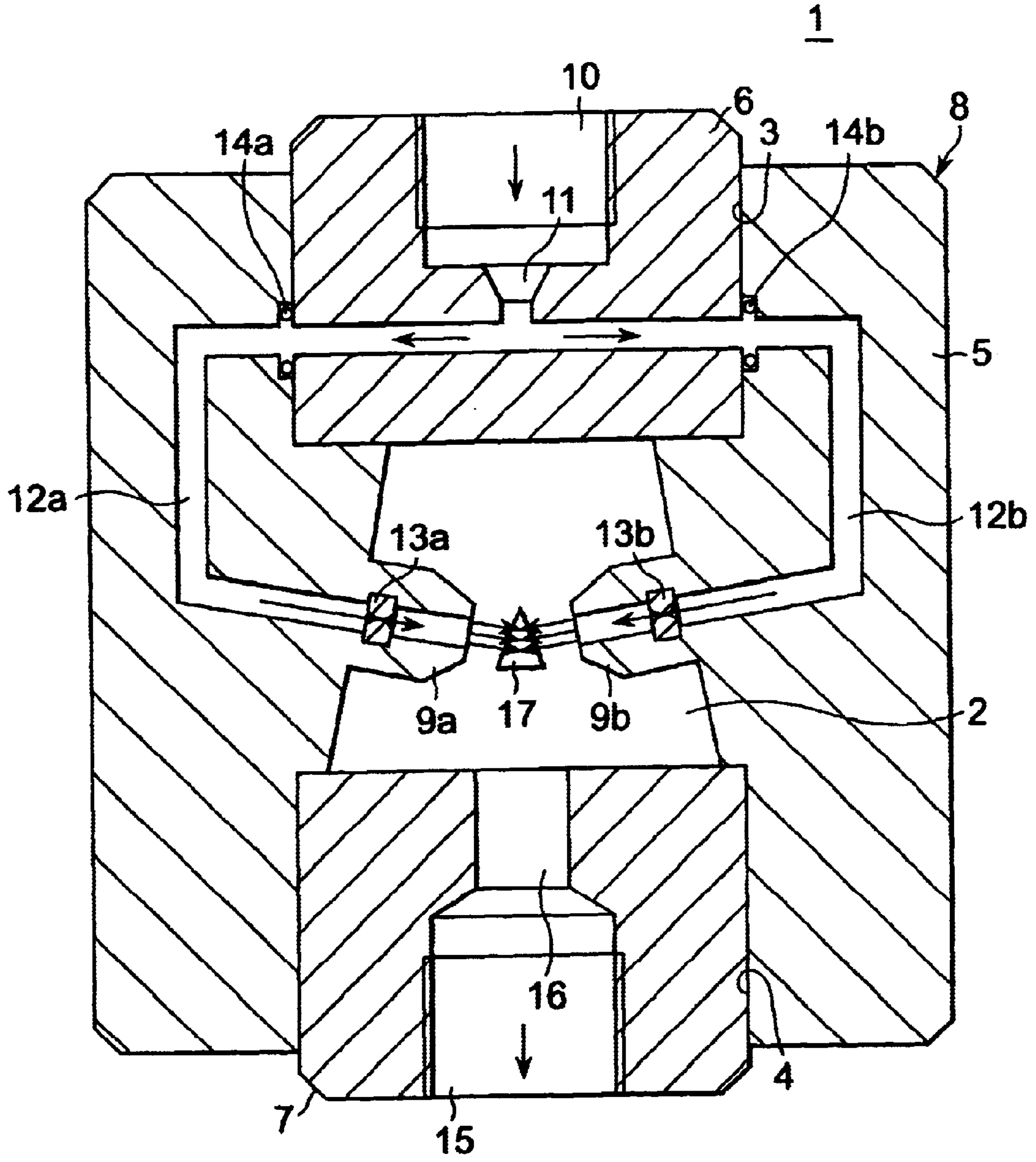
FIG. 3 is a sectional view showing another usage mode of the dispersion medium preparation mechanism of FIG. 2.
Figure 4:
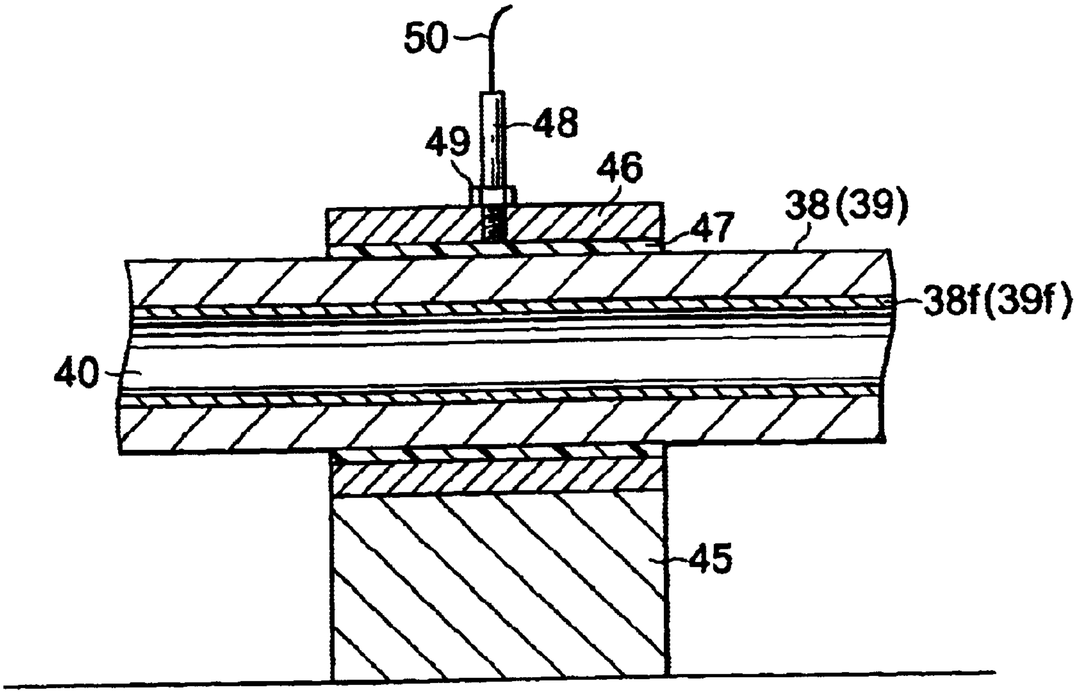
FIG. 4 is a sectional view of the major portion of a first chamber (or a second chamber) incorporated in FIG. 1.
Figure 5:
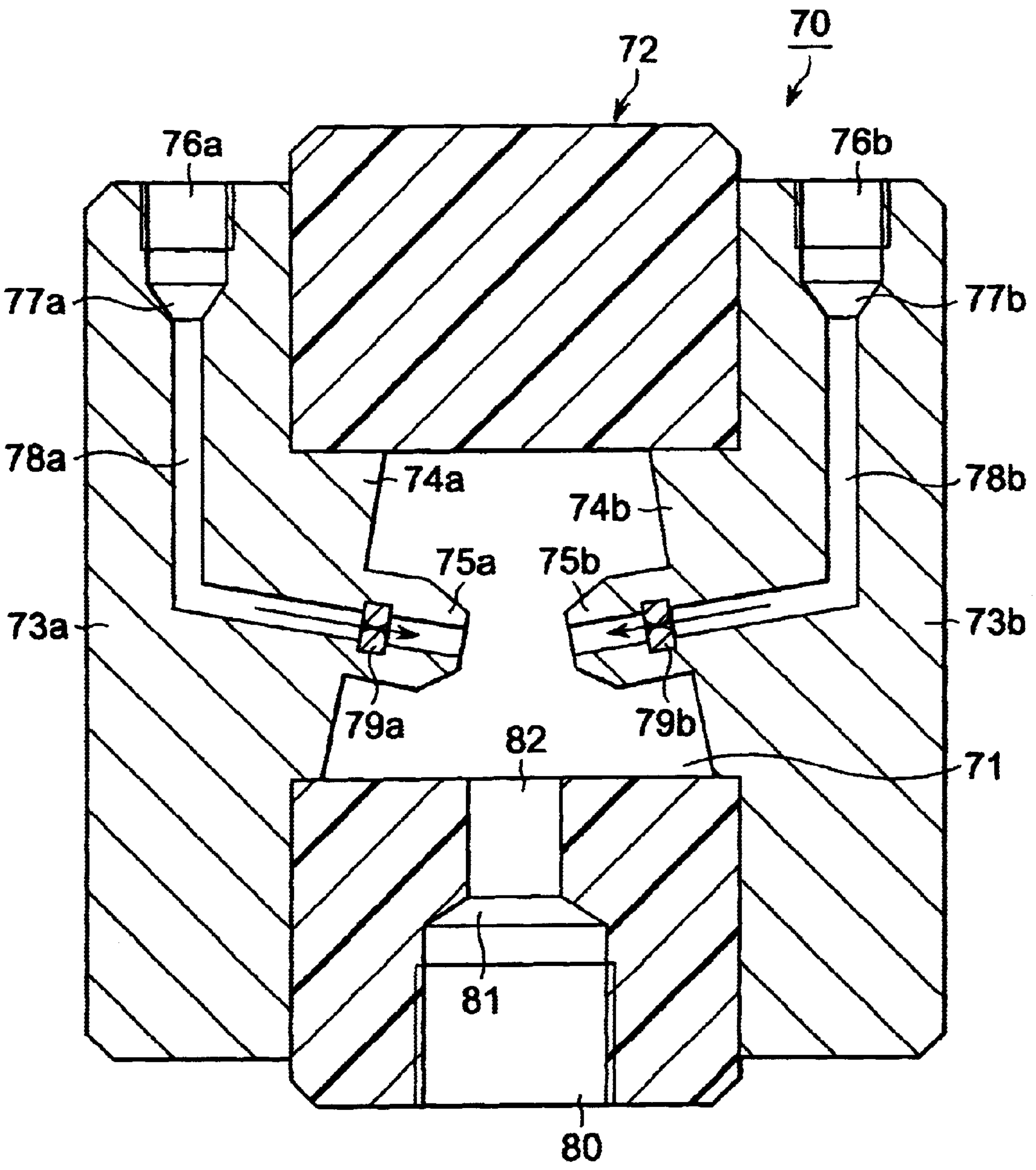
FIG. 5 is a sectional view showing an aggregation/bonding mechanism of ultrafine particles incorporated in the manufacturing apparatus of FIG. 1.

FIG. 1 is a top view schematically showing a manufacturing apparatus of a composite ultrafine particle according to the first embodiment, FIG. 2 is a sectional view showing a dispersion medium preparation mechanism incorporated in FIG. 1, FIG. 3 is a sectional view showing another mode for use in the dispersion medium preparation mechanism of FIG. 2, FIG. 4 is a sectional view of the major portion of a first chamber (or a second chamber) incorporated in FIG. 1, and FIG. 5 is a sectional view showing a aggregation/bonding mechanism of ultrafine particle incorporated in the manufacturing apparatus of FIG. 1.

A dispersion medium preparation mechanism 1 is connected to a charging mechanism 30 through a pipe 61 and two pieces of branching pipes 62*a* and 62*b*. These branching pipes 62*a* and 62*b* are, for example, made of an insulating material such as polyimide. The charging mechanism 30 contains two pieces of the pipes 63*a* and 63*b*, and is connected to an aggregation/bonding mechanism of ultrafine particles through these pipes 63*a* and 63*b*. The pipes 63*a* and 63*b* are made, for example, of an electrically conductive material such as stainless steel, and a thin film of platinum or gold is coated on the internal surface.

The dispersion medium preparation mechanism 1 has, for example, as shown in FIG. 2 and FIG. 3, a main block 5 having an upper portion rectangularly shaped hole 3 and a lower portion rectangularly-shaped hole 4 communicating a cavity portion 2 in a quadrilateral pyramid and upward and downward of the cavity portion 2, a main body 8 having upper and lower portion blocks 6 and 7 inserted and fixed in the upper and lower rectangularly shaped holes 3 and 4. It should be noted that the diameters of its upper and lower openings of the cavity portion 2 shaped in a quadrilateral pyramid is smaller than those of the rectangular-shaped holes 3 and 4.

A plurality of, for example, two nozzle sections 9*a* and 9*b* are formed so that these are each other opposed to the main block 5 located on the intermediate internal surface of the cavity section 2. It is preferable that the openings of the tips (discharging outlet) of these nozzle sections 9*a* and 9*b* have a diameter ranging from a few microns to hundred and a few of tens microns in viewpoint of enhancing an injecting speed of solid-liquid mixed fluid that is a liquid medium in which the desired amounts of materials different from each other are mixed.

On the upper block 6, a screw hole 10 is provided from its top surface. In and to this screw hole 10, the pipe described later is screwed, attached and connected. The screw hole 10 is communicated with two pieces of branching passages 12*a* and 12*b* through an inverse cone shaped passage 11. The respective branching passages 12*a* and 12*b* are extended from the upper section block 6 through the main block 5 to the tip surfaces of the two nozzle sections 9*a* and 9*b* and the openings are closed on these tip surfaces, respectively.

The respective branching passages 12*a* and 12*b* located at the root of the nozzle sections 9*a* and 9*b* are equipped with orifice sections 13*a* and 13*b* for accelerating fluid speed of the solid-liquid mixed fluid introduced into the respective branching passages 12*a* and 12*b*, respectively.

As for the nozzle section, a plurality of, that is, three or more may be employed. The plurality of nozzle sections are mounted on the main block 5, for example, at the isoperimeric angles on the circular tracing of the plane, for example, in the case where there are two nozzles, the nozzle sections are mounted on the main block 5 at the angles of 180 degrees in the case where there are three nozzles, at the angle of 120 degrees and in the case where there are four nozzles, at the angles of 90 degrees. Particularly, from the viewpoint of crashing injection flows of the solid-liquid mixed fluids in a good balance and in a higher energy, it is preferable that the nozzle sections of even numbers such as 2, 4, 6 are mounted on the body.

Although the plurality of nozzle sections may be mounted on the main block 5 so that solid-liquid mixed fluids are injected in a horizontal direction and crossed and crashed each other, these are preferably mounted on the main block 5 so that the solid-liquid fluids are injected in a slanting direction and crossed and crashed each other. If such a configuration is made, it is possible that the crashing region of the solid-liquid mixed fluid injecting flows from the plurality of nozzle sections or the crashing region of the injection flow to the mixed fluid crashing member is widened. Moreover, the nozzle section and the main block can be prevented from damaging by the injecting flows from the nozzles of the opposing side.

It should be noted that O rings 14*a* and 14*b* are interposed in the branching passages 12*a* and 12*b* located at the joining line of the upper block 6*a* and the main block 5, respectively.

On the lower block 7, a screw hole 15 is provided from its lower surface. This screw hole 15 is communicated with the cavity section 2 of the main block 5 through circular cylindrical hole 16. It should be noted that in the screw hole 15 of the lower block 7, the pipe 61 is screwed, attached and connected.

A mixed fluid crashing member 17 made of at least rigidity of the surface of a material being higher than that of a material in the solid liquid mixed fluid (for example, particle) penetrates through the main block 5 and is inserted in the cavity section 2 in a attachable and detachable manner. When the mixed fluid crashing member 17 is inserted in the cavity section 2, the crashing member 17 is located at the injection flow crossing section of the two solid-liquid mixed fluids injected from the nozzle sections 9*a* and 9*b*, and the injection flows of the respective solid-liquid mixed fluids are substantially crashed on the two faces of the mixed fluid crashing member 17.

As the mixed fluid crashing member 17, a structural member made of at least the surface of a material having a rigidity higher than that of the fine particle in the solid-liquid mixed fluid may be employed. However, in the case where the desired material in the solid-liquid mixed fluid comprises a plurality of kinds, it is necessary that making the most rigid material to be the reference, and the mixed fluid crashing member is formed from a material more rigid than the reference. It is preferable that the mixed fluid crashing member is produced from a substrate made of metal such as iron whose surface is electrodeposited by a large number of diamond particles, cobalt or sintered diamond and hard metal sintered compact from the viewpoint of enhancing the breaking force to the materials in the solid-liquid mixed fluid (especially, particles of metal and inorganic material) as well the mixed fluid crashing member as suppresses the abrasion because of the injection flow of the solid-liquid mixed fluid. It is preferable that a substrate made of a metal whose surface of the former is electrodeposited by a large number of diamond particles is made into a structure in which a large number of diamond particles of average particle diameter 5 to 10 $\mu$m are electrodeposited on the substrate made of a metal at the area rate of 70% or more. Particularly, a mixed fluid crashing member made of a sintered diamond is preferable since the efficiency of converting the energy at the time of injection flows crashing of the solid-liquid mixed fluids into the breaking force is high and excellent in abrasion resistance.

As to the mixed fluid crashing member 17, it is preferable for its shape, however, it is preferable that it is formed in a shape having a surface (crashing surface) opposing to the opening portion of these corresponding to the number of the nozzles, for example, it is formed in a triangle pole shape. Its crashing energy can be more efficiently converted into the breaking force of materials in the solid-liquid mixed fluid (especially, particles of metal and inorganic materials) when the solid-liquid mixed fluids injected from the plurality of nozzle sections are crashed on the mixed fluid crashing member by employing such mixed fluid crashing member.

As shown in FIG. 1, the pipe 18 into which the solid-liquid mixed fluid is introduced is screwed in the screw hole 10 of the upper block 6 and attached to it and fixed on it by a nut 19. A high pressure conveying pump 20 is interposed in the pipe 18. A valve 21 is interposed in the pipe 18 on the upstream side of the high pressure conveying pump 20. A bypass pipe 22 is branched from the pipe 61 screwed into the screw hole 15 and attached to it of the lower portion block 7, and its tip is connected to the high pressure conveying pump 20. Two valves 23 and 24 are interposed in the bypass pipe 22 on the side of the bypass pipe 22 nearby the branching portion of the bypass pipe 22 and between the portions of the pipe 61 on the downstream side of the pipe 61, respectively.

The charging mechanism 30 is equipped with support boards 31*a* and 31*b* disposed parallel to each other. On these support boards 31*a* and 31*b*, respective two (four in total) penetrating holes (not shown) are opened opposing to each other. Four joint members 34 comprising the circular cylindrical portion 32 and a smaller circular cylindrical portion 33 which is integrally attached to this circular cylindrical portion 32 in a concentric shape are inserted into the penetrating holes (not shown) of the support boards 31*a* and 31*b* so that the smaller circular cylindrical portions 33 are on the tip sides from the opposing face of these support boards 31*a* and 31*b*, and step portions of the circular cylindrical portions 32 and the smaller circular cylindrical portions 33 are contacted with the opposing faces of the support boards 31*a* and 31*b*. On the respective smaller circular cylindrical portions 33, screw holes (not shown) are provided from its end faces. On the respective circular cylindrical portions 32, convex portions 35 in a circular cylindrical shape are provided from the end face and the convex portions 35 are communicated within the screw holes (not shown) of the smaller circular cylindrical portions 33 through small diameter passages 36.

Two caps 37 made of an insulating material such as nylon or the like are covered and attached the both end portions of a first circular cylindrical chamber 38 and a second circular cylindrical chamber 39, respectively. The both end portions of the first and second circular cylindrical chambers 38 and 39 are disposed so that these are parallel to each other between the support boards 31*a* and 31*b* by inserting these end portions into the convex portions 35 of the circular cylindrical portions 32 of the joint member 34. For example, the first and second chambers 38 and 39 are made of stainless steel. It should be noted that passages 40 narrowing the sectional area nearby the inlet/outlet of both ends are provided in the longitudinal direction within the first and second chambers 38 and 39. In the center of the respective caps 37, smaller holes communicating with the passages 40 of the first and second chambers 38 and 39 and the smaller diameter passage 36 of the joint member 34 are opened, respectively. On the internal surface where the passages 40 of the first and second chambers 38 and 39 are formed, a thin film 38*f* (39*f*) of platinum (or gold) is coated as shown in FIG. 4, respectively.

Eight pieces of bar spacer 41 having screw holes on both end portions are disposed so that these surrounds the first and second chambers 38 and 39 between the support boards 31*a* and 31*b* and are parallel to each other. Eight pieces of he screws 42 are screwed in and attached to the screw holes of both end portions of the bar spacer 42 from the opposing faces and the opposite faces the support boards 31*a* and 31*b*. Due to the disposition of these bar spacers 41 to the support boards 31*a* and 31*b* and the screwing and attachment of the bar spacers 41 by the screws 42, the circular cylindrical portions 32 of the joint members 34 are moved so as to be closer together the first and second chambers 38 and 39 whose both end portion are inserted into the convex portions 35 of these circular cylindrical portions 32 are supported and fixed between the support boards 31*a* and 31*b* as well as the support boards 31*a* and 31*b* are fixed at the predetermined interval each other.

The thread cut tip portions of the two pieces of branching pipes 62*a* and 62*b* are screwed in and attached to the screw holes of the smaller circular cylindrical portions 33 of the two joint members 34 mounted on the side of the support board 31*a*, and firmly and strongly coupled and fixed by a nut 43. The cut thread one end portion of the two pieces of pipes 63*a* and 63*b* is screwed in, attached to the screw hole of the smaller circular cylindrical portion 33 of the two joint member 34 mounted on the side of the support board 31*b*, and firmly and strongly coupled and fixed by a nut 44.

A chamber bearer 45 supports nearby the center of the first and second chambers 38 and 39 as shown in FIG. 4. For example, a circular cylindrical high frequency supplying members 46 made of an electrically conductive material such as copper or the like are disposed nearby around the center of the first and second chambers 38 and 39 where the chamber bearer 45 is located, respectively. A circular cylindrical insulating member 47 through which high frequency is capable of being transmitted is disposed on the respective inner circumferential surfaces of the high frequency supplying member 46 in the circular cylindrical shape, and is directly contacted with the outer circumferential surface of the chambers 38 and 39. It should be noted that the circular cylindrical high frequency supplying member 46 and the circular cylindrical insulating member 47 are divided into two in the axis direction, respectively, and are disposed nearby the center of these chambers 38 and 39 by fitting from the upward and downward directions. A high frequency supplying terminals 48 are screwed in and attached to the respective high frequency supplying members 46, respectively, and fixed by nuts 49. As for two wirings 50, one end of it is connected to the high frequency supplying terminal 48, and the other end of it is connected to a high frequency source 51.

The insulating member 47 is made from, for example, fluororesin such as polytetrafluoroethylene or the like or polyvinyl chloride resin or ceramic such as alumina or zirconia. Moreover, the insulating member 47 preferably has the thickness of 50 to 500 $\mu$m. Owing to the insulating member 47 thus configured, a high frequency voltage supplied to the circular cylindrical supplying member 46 through the wiring 50 and the supplying terminal 48 is capable of efficiently being applied to the first and second chambers 38 and 39, and the direct current from the dispersion medium electrified communicating within the first and second chambers 38 and 39 can be prevented from flowing backward through the high frequency passage and flowing into the high frequency source 51 and damaging it.

A direct current source 52 is connected to the pipes 63*a* and 63*b* coupled to a member on the downstream side in the flow direction of the dispersion medium than the application position of the high frequency voltage, for example, coupled to the first and second chambers 38 and 39 through the wirings 53 and 54 so that one is positive and the other is negative.

It should be noted that the first and second chambers 38 and 39 are not limited to the case being made of electrically conductive material. For example, the first and second chambers may be also configured by providing a passage narrowing the cross sectional area nearby the inlet/outlet of both ends in the longitudinal direction within the circular cylindrical body made of an electrically conductive material such as stainless steel or the like and by coating a thin film made of an insulating material through which high frequency is capable of being transmitted on the inner surface where this passage is located. In this case, a high frequency supplying terminal connected to the high frequency source through the wiring is directly mounted on the circular cylindrical body. In the first and second chambers thus configured, by employing the thin film, the direct current can be prevented from flowing backward from the electrified disperse medium to the high frequency source similarly to the circular cylindrical insulating member 47 where high frequency voltage is capable of being transmitted as shown in FIG. 4 and a simplified structure can be realized.

Moreover, connecting places of the wirings 53 and 54 of the direct current source 52 are not limited to the pipes 63*a* and 63*b*. For example, the wiring of the direct current source may be also connected to the first and second chambers 38 and 39 made of electrically conductive material on the downstream side in the flow direction of the dispersion medium than the application position of the high frequency. Moreover, the wiring of the direct current source may be connected to the first and second blocks 73*a* and 73*b* aggregation/bonding mechanism 70 described later. In this case, the first and second blocks 73*a* and 73*b* of the aggregation/bonding mechanism 70 becomes a form of sharing the same charging mechanism. In such a connecting form of the direct current source, it is preferable to shorten the length of the pipes 63*a* and 63*b* in order to maintain the excitation state of the dispersion medium up to the passages of the first and second blocks, to which high frequency is applied through the first and second chambers 38 and 39.

The aggregation/bonding mechanism 70 has for example, as shown in FIG. 5, a rectangular shaped main block 72 which is a support body having a rectangular hole 71 opened to the faces of both sides and first and second blocks 73*a* and 73*b* mounted so as to surround the rectangular hole 71 on the faces of both sides of this main block 72. The rectangular shaped main block 72 is made of an insulating material, for example, such as nylon or the like. The first and second blocks 73*a* and 73*b* are made of an electrically conductive material, for example, such as stainless steel or the like. It should be noted that an insulating film may be coated on the outer surface of the first and second blocks 73*a* and 73*b*. The first and second blocks 73*a* and 73*b* have rectangularly shaped projecting portions 74*a* and 74*b* formed on the surface opposing to the main block 72, respectively, and these projecting portions 74*a* and 74*b* are fitted into the rectangular holes 71 of the main block 72.

Two nozzle sections 75*a* and 75*b* are projecting from the first and second blocks 73*a* and 73*b* so as to be opposing each other within the rectangular hole 71. It is preferable that these nozzle portions 75*a* and 75*b* are slanting downward at the desired angle from the similar reason described in the above-described dispersion medium preparation mechanism 1. It is preferable that the openings (discharging outlet) of the tip of these nozzle sections 75*a* and 75*b* have a diameter ranging from a few microns to a hundred and a few of tens microns from the viewpoint of enhancing the injection speed of the dispersion medium.

On the first and second blocks 73*a* and 73*b*, on its upper portion, screw holes 76*a* and 76*b* are opened, respectively. These screw holes 76*a* and 76*b* are communicated to the passages 78*a* and 78*b* formed in the first and second blocks 73*a* and 73*b* through inverse cone shaped holes 77*a* and 77*b*. These passages 78*a* and 78*b* are extended up to the tip surfaces of the two nozzle portions 75*a* and 75*b*, and opened on these tip surfaces. The inner surfaces of the inverse cone shaped holes 77*a* and 77*b* and the passages 78*a* and 78*b* are coated by a thin film of platinum or gold. Orifice portions 79*a* and 79*b* for accelerating the flow speed of the disperse medium introduced in the respective passages 78*a* and 78*b* are interposed in the respective passages 78*a* and 78*b* located at the roots of the nozzle sections 75*a* and 75*b*, respectively.

A screw hole 80 is provided from the lower surface of the main block 72 toward the internal. This screw hole 80 is communicated to the rectangular hole 71 of the main block 72 through a cone shaped hole 81 and a circular cylindrical-shaped hole 82.

The one end portions of the pipes 63*a* and 63*b* are coupled to the two joint members 34, and the other end portions which have been thread cut are screwed in and attached to the screw holes 76*a* and 76*b* of the first and second blocks 73*a* and 73*b*, respectively, and firmly and strongly fixed and connected by nuts 83*a* and 83*b*. The discharging pipe 64 whose thread cut one end portion is screwed in and attached to the screw hole 80 of the main block 72.

Next, a method of manufacturing a liquid medium containing a composite fine particle according to the first embodiment of the present invention will be described below with reference to a manufacturing apparatus.

(Step of Preparing Dispersion Medium)

First, as shown in FIG. 1 and FIG. 3, the mixed fluid crashing member 17 of the dispersion medium preparation mechanism 1 is previously positioned so as to be out of the injection flow crossing portion of the solid-liquid mixed fluid of the two nozzle sections 9*a* and 9*b*.

The solid-liquid mixed fluid in which the desired amount of different materials from each other are mixed into the liquid medium is introduced to the high pressure conveying pump 20 through the pipe 18, where the fluid is pressurized to the higher pressure and introduced within the screw hole 10 of the upper block 6 of the dispersion medium preparation mechanism 1. This highly pressurized solid-liquid mixed fluid is introduced to the branching passages 12*a* and 12*b* through the inverse cone shaped passage 11 of the upper block 6, respectively. The solid-liquid mixed fluid flown into these branching passages 12*a* and 12*b* is accelerated in the process of passing through the orifices 13*a* and 13*b*, and injected from the opening portions of the nozzle sections 9*a* and 9*b* within the cavity portion 2 of the main block 5 at a high speed. At this time, since the branching passages 12*a* and 12*b* of the nozzle sections 9*a* and 9*b* disposed opposing to each other are slanting toward the downward, the solid-liquid mixed fluid injected from the openings of the nozzle sections 9*a* and 9*b* are crossed and crashed each other. Owing to this, a dispersion medium into which the fine particles (or ultrafine particles) are dispersed and ultrafine particles of different materials from each other are dispersed are prepared as well as the different materials from each other in the solid-liquid mixed fluid are broken to be fine particles.

As the liquid medium, for example, alcohol's such as ethyl alcohol, isopropyl alcohol, isobutyl alcohol, ketones such as methyl ethyl ketone or organic solvent such as dimethylsulfoxide, toluene, xylene or the like, or water can be listed. These liquid media can be employed in a form of single liquid or mixed liquid corresponding to the kinds or combinations of the materials to be dispersed.

As the materials different from each other, organic polymers, metals, inorganic compounds or the like can be listed. Now, as the combinations of different materials from each other, for example, (a) a form of employing different organic polymers, and (b) a form of employing at least one kind of organic polymers and at least one kind selected from metals and inorganic compounds, are listed.

As the organic polymers, for example, a variety of thermoplastic resins such as polyethylene, polypropylene, polyphenylene sulfite, polyimide, acrylic resin, polyester, polyvinyl alcohol, ethylene acetate vinyl alcohol, or raw composition resin such as polylactate can be listed. Moreover, it is possible that as the organic polymer, thermosetting resin except for the thermoplastic resin is used. Furthermore, organic polymers of two kinds or more whose physical properties are different are allowed to use. The organic polymer is used by resolving or dispersing into the liquid medium. In the case where the organic polymer is dispersed, it is preferable to employ the particles whose diameter is 10 $\mu$m or less, and more preferably 1 $\mu$m or less.

As the metals, for example, all of iron, silver, stainless steel and the like can be listed. As to the metals, it is preferable to use a metal whose diameter of the particle is 10 $\mu$m or less, and more preferably 1 $\mu$m or less.

As the inorganic compounds, for example, carbon, graphite, oxide based ceramics such as glass, a variety of metal salts, or silicon oxide, zirconium oxide, titanium oxide, alumina, and chromium oxide, nitride based ceramics such as silicon nitride, aluminum nitride and boron nitride, carbide based ceramics such as silicon carbide, boron carbide and the like can be listed. As to the inorganic compounds, it is preferable to employ the diameter of particles being 10 $\mu$m or less, and more preferably 1 $\mu$m or less.

As for amounts of different kinds from each other blended in the liquid medium, it is preferable that (a) in the case where different kinds of organic polymers are employed; 10 to 20% by weight, and (b) in the case where at least one kind of organic polymers and at least one kind selected from metals and inorganic compounds are employed; 5 to 15% by weight.

It is preferable that the pressurized pressure of the solid-liquid mixed fluid introduced to the body 8 of the dispersion medium preparation mechanism 1 is 500 kg/cm$^2$ or more. It is preferable that the injection speed of the solid-liquid mixed fluid injected from the two nozzle sections 9*a* and 9*b* is 300 m/sec or more. If the pressurized pressure of the solid-liquid mixed fluid is less than 500 kg/cm$^2$, the injection flow speed of the solid-liquid mixed fluid is 300 m/sec, it may become difficult to break and ultrafinely disperse the materials such as organic polymers in the solid-liquid mixed fluid. It is preferable that the upper limitations of the pressurized pressure of the solid-liquid mixed fluid and the injection flow rate of the solid-liquid mixed fluid are practically 3,000 kg/cm$^2$ and 600 m/sec, respectively.

It is preferable to adopt the following forms corresponding to the kinds of material and the combinations in the solid-liquid mixed fluid at the time of breaking and dispersing operations of the solid-liquid mixed fluid by the dispersion medium preparation mechanism 1.

(1) Mode that Materials in Solid-liquid Mixed Fluid are Different Kinds of Organic Polymers As described above, the solid-liquid mixed fluids are forced to be injected from the two nozzles 9*a* and 9*b* and crossed/crashed each other without locating the mixed fluid crashing member 17 at the crossing/crashing portion of the cavity portion 2 of the main body 8. Using such a method, molecular chains of the organic polymers in the solid-liquid mixed fluid can be prevented from being excessively cut.

(2) Mode that Materials in Solid-liquid Mixed Fluid is Made be Ultrafine Particle and Ultrafinely Dispersed First, the valve 24 of the pipe 61 shown in FIG. 1 is closed, and the valve 23 of the bypass pipe 22 is opened. Subsequently, the solid-liquid mixed fluid that is a liquid medium in which the desired amounts of different materials from each other are mixed is introduced to the high pressure conveying pump 20 through the pipe 18, where it is pressurized to be higher pressure, introduced within the screw hole 10 of the upper block 6 and after filling it with the solid-liquid mixed fluid up to the bypass pipe 22, the valve 21 interposed in the pipe 18 is closed. That is to say, the high pressure conveying pump 20 and the main body 8 are made be a closed loop by the bypass pipe 22. After this process, the solid-liquid mixed fluids are injected from the openings of the nozzle sections 9*a* and 9*b* and crossed/crashed each other similarly to the case described above. The operation is repeated such that the solid-liquid mixed fluid after crossing/crashing operations is sent back to the high pressure conveying pump 20 through the bypass pipe 22, where it is enhanced to the desired high pressure, introduced within the screw hole 10 of the upper block 6 of the main body 8, and injected from the openings of the nozzle sections 9*a* and 9*b* and crossed/crashed each other.

In this way, by repeating the operation such that the solid-liquid mixed fluid is crossed/crashed each other, the particles are dispersed, for example, a dispersion medium in which ultrafine particles of a few hundreds nanometers or less are uniformly dispersed can be prepared as well as different materials from each other in the mixed fluid are broken to be ultrafine particles.

It should be noted that after the flow speed of the solid-liquid mixed fluid in the following description is calculated and the fluid is injected from the openings of the nozzle sections 9*a* and 9*b* and crossed/crashed each other, the operation up to the process immediately before the crossed/crashed solid-liquid mixed fluid is again crossed/crashed is referred to as "one pass".

(3) Mode that Solid-liquid Mixed Fluid in Which Metals and Inorganic Compounds Difficult to Break and Organic Polymers are Mixed is Made Broken and Dispersed First, as shown in FIG. 2, the mixed fluid crashing member 17 is penetrated through the main block 5 and inserted in the cavity portion 2 so that the mixed fluid crashing member 17 is previously substantially located at the injection flow crossing portion of the solid-liquid mixed fluid of the two nozzle sections 9*a* and 9*b*. Subsequently, the solid-liquid mixed fluid in which the desired amounts of fine particles of metals and inorganic compounds and organic polymers are mixed is introduced to the high pressure conveying pump 20 through the pipe 18, where the liquid is pressurized to a high pressurized liquid, and introduced within the screw hole 10 of the upper block 6. This high pressurized solid-liquid mixed fluid is introduced to the branching passages 12*a* and 12*b* through the inverse cone shaped passage 11 of the upper portion block 6, respectively. The solid-liquid mixed fluid flown to these branching passages 12*a* and 12*b* is further accelerated in the process passing through the orifices 13*a* and 13*b*, is made injected from the openings of the nozzle sections 9*a* and 9*b* within the cavity portion 2 of the main block 5. At this time, since the branching passages 12*a* and 12*b* of the nozzle sections 9*a* and 9*b* disposed opposing to each other are slanting toward the downward, the solid-liquid mixed fluid injected from the openings of the nozzle sections 9*a* and 9*b* crashes against the mixed fluid crashing member 17 substantially located at the crashing injection flows crossing portion. Therefore, crashing energy that the fine particles of the solid-liquid mixed fluid is significantly enhanced compared with the crashing energy of the case where the solid-liquid mixed fluid are crashed each other. Particularly, by making the shape of the mixed fluid crashing member 17 to be a triangle column, two solid-liquid mixed fluids injected from the two nozzle sections 9*a* and 9*b* can be crashed in the vertical direction or in an approximately vertical direction on the two surfaces of the mixed fluid crashing member 17 of the triangle column. Therefore, a higher crashing energy can be applied to the fine particles in the solid-liquid mixed fluid. Moreover, by making the mixed fluid crashing member 17 of a sintered diamond having the highest rigidity among the currently available materials, the breaking conversion efficiency of the crashing energy can be still further enhanced.

As a result, the dispersion of ultrafine particles can be realized as well as the fine particles of the metals or inorganic compounds in the solid-liquid mixed fluid can be efficiently broken to be ultrafine particles, which has been difficult by the method of making the solid-liquid mixed fluids crash.

It should be noted that in the form of the (3), as the mode of the (2), the operation in which the solid-liquid mixed fluid is injected from the two nozzle sections 9*a* and 9*b* and crashed to the mixed fluid crashing member 17 are allowed to perform in a plurality of passes.

(4) Mode that Solid-liquid Mixed Fluid in Which Different Kinds of Organic Polymers not Easily Coupled is Broken/Dispersed First, for example, two kinds of solid-liquid mixed media are prepared by blending the desired amounts of different organic polymers from each other into a liquid medium. The valve 24 of the pipe 61 shown in FIG. 1 is closed, and the valve of the bypass pipe 22 is opened. Subsequently, one of the solid-liquid mixed fluids is introduced to the high pressure conveying pump 20 through the pipe 18, where the liquid is pressurized to the pressurized liquid, introduced within the screw hole 10 of the upper portion block 6 and after filling it with the solid-liquid mixed fluid up to the bypass pipe, the valve 21 interposed in the pipe 18 is closed. Subsequently, organic polymers in the solid-liquid mixed fluid is made ultrafine particles and ultrafinely dispersed by performing a plurality of passes of the operation in which the solid-liquid mixed fluids are injected from the openings of the nozzle sections 9*a* and 9*b* and crossed/crashed each other similarly to the above-described case.

Subsequently, after the drive of the high pressure conveying pump 20 is stopped and the valve 21 is opened, the other portion of solid-liquid mixed fluid is introduced to the high pressure conveying pump 20 through pipe 18, and the other portion of the solid-liquid mixed fluid is mixed into the one portion of the solid-liquid mixed fluid by driving this pump 20 and enhancing it to the high pressure. The operation that the solid-liquid mixed fluid in which two kinds of the organic polymers are mixed is injected from the openings of the nozzle sections 9*a* and 9*b* and crossed/crashed each other is repeatedly performed in a plurality of passes.

Owing to this procedure, a dispersion medium ultrafinely dispersed can be adjusted as well as organic polymers difficult to be mixed together is coupled to some extent and made it to be ultrafine particles.

It should be noted that although the preparation of the dispersion medium is performed using the dispersion medium preparation mechanism 1 shown in FIG. 1, FIG. 2 and FIG. 3, the solid-liquid mixed fluid in which the different materials from each other are mixed into the liquid medium in the aggregation/bonding mechanism 70 shown in FIG. 1 and operation described later being performed is introduced, where the dispersion medium in which different kinds of materials become ultrafine particles and dispersed may be utilized. However, in the case where this aggregation/bonding mechanism 70 are shared as a preparation mechanism of he dispersion medium, the application of the direct current voltage to the first and second chambers 38 and 39 of the charging mechanism 30 are stopped, and these chambers 38 and 39 is simply utilized as a passage. Moreover, the highly pressurized fluid conveying pump is interposed in the conduit as well as a conduit of the solid-liquid mixed fluid is provided on the upstream side of the first and second chambers 38 and 39.

(Step of Electrifying Dispersion Medium)

The highly pressurized dispersion medium prepared in the dispersion medium preparation mechanism 1 is introduced to the smaller diameter passage 36 of the joint member 34 of the charging mechanism 30 through the pipe 61 and the branching pipes 62*a* and 62*b*, respectively, and further communicated from the joint member 34 within the passage 40 of the first and second chambers 38 and 39 at high speed, and still further, flows out to the pipes 63*a* and 63*b* located at the downstream of the chambers.

At this time, as shown in FIG. 4, the desired high frequency voltage is supplied from the high frequency source 51 to the circular shaped supplying member 46 through the wiring 50 and the electricity supplying terminal 48, from these circular-shaped electricity supplying member 46, the high frequency voltage is supplied within the first and second chambers 38 and 39, for example, transmitted through the circular-shaped insulating member 47 made of polytetrafluoroethylene. Owing to this, the dispersion medium containing ultrafine particles communicating within the first and second chambers 38 and 39 are excited, respectively. At the same time, the direct current is supplied from the direct current source 52 to the pipes 63*a* and 63*b* located on the downstream side than the application position of the high frequency voltage through the wirings 53 and 54. Owing to this, it is and the dispersion medium communicating within the first chamber 38, and containing ultrafine particles already excited is negatively charged. Moreover, the dispersion medium communicating within the second chamber 39, and containing the ultrafine particles already excited is positively charged. Since fluctuation can be made generated in the dispersion medium by applying such a high frequency voltage, the sufficient volumes of negative electrification and positive electrification can be applied to the respective dispersion media by subsequent application of the direct current voltage.

It should be noted that in the process in which the dispersion medium is communicated within the passage 40 of the first and second chambers 38 and 39, since the passages are narrowed nearby these outlets, the flows of the respective dispersion media are accelerated.

Moreover, when the high frequency voltage is supplied to the first and second chambers 38 and 39, as shown in FIG. 4, the electricity supplying member 46 is not directly connected to the first and second chambers 38 and 39, by intervening the insulating member 47 between these, the direct current voltage can be prevented from inversely flowing to the high frequency source 51 through the positively and negatively charged dispersion fluid described above and damaging the source 51.

Furthermore, by forming the branching pipes 65*a* and 65*b* for connecting the dispersion medium preparation mechanism 1 and 90 and the charging mechanism 30, respectively, with an insulating material, the direct current voltage can be prevented from flowing into the dispersion medium preparation mechanism 1 and 90 through the positively and negatively charged dispersion fluids described above.

It is preferable that the high frequency voltage supplied from the high frequency source 51 is set ranging from 500 kHz to 10 MHz and ranging from 20 V to 400 V.

It is preferable that the direct current voltage supplied from the direct current source 52 is set ranging from 0.5 A to 10 A, and ranging from 100 V to 5 kV.

(Step of Manufacturing a Liquid Medium Containing Composite Ultrafine Particles by Aggregation/Bonding of Ultrafine Particles)

The dispersion media charged in different polarities from each other in the charging mechanism 30 and the pipes 63*a* and 63*b* made of the electrically conductive material are introduced with a high pressure from the pipes 63*a* and 63*b* within the screw holes 76*a* and 76*b* of the first and second blocks 73*a* and 73*b* made of an electrically conductive material separated by the main block 72 made of an insulating material of the aggregation/bonding mechanism 70, respectively. Since the first and second blocks 73*a* and 73*b* are electrically separated by the main block 72 made of an insulating material, the highly pressurized respective dispersion media are introduced to the passages 78*a* and 78*b* as maintaining these electrification volume. These dispersion media are further accelerated in the process of passing through the orifices 79*a* and 79*b* of the respective passages 78*a* and 78*b*, and made injected from the openings of the nozzle sections 75*a* and 75*b* within the rectangular hole 71 of the main block 72. At this time, since the passages 78*a* and 78*b* of the nozzle sections 75*a* and 75*b* disposed opposing to each other are slanting toward the downward, the respective dispersion media injected from the openings of the nozzle sections 75*a* and 75*b* are efficiently crossed/crashed each other. In such a crashing field, the ultrafine particles in the respective dispersion media electrified in different polarities from each other are aggregated and coupled each other by excitation transfer as well as strongly attracted each other and electrostatically aggregated each other. As a result, a liquid medium containing a large number of composite ultrafine particles comprising different kinds of materials can be manufactured by the procedure that ultrafine particles made from the different materials from each other which have been dispersed prior to the injection from the nozzle sections 75*a* and 75*b* are coupled each other.

In manufacturing a liquid medium containing composite ultrafine particles described above, when the dispersion medium charged by the first and second chambers 38 and 39, the pipes 63*a* and 63*b* and the passages 78*a* and 78*b* of the first and second blocks 73*a* and 73*b* of the aggregation/bonding mechanism 70 made of metal such as stainless steel is communicated, by the respective dispersion media charged from the inner surface side of these members, it is electrolyzed and resolved. In particular, the member through which the dispersion medium charged positively is communicated is remarkably electrolyzed and resolved. From this matter, the resolving by electrolysis of the charged dispersion media can be prevented by coating a thin film of platinum and gold on inner surfaces of the first and second chambers 38 and 39, the inner surfaces of the pipes 63*a* and 63*b* and the inner surfaces of the passages 78*a* and 78*b* of the first and second blocks 73*a* and 73*b* of the aggregation/bonding mechanism 70.

Up to this point, as described above, according to the first embodiment of the present invention, the dispersion medium is introduced to the first and second chambers and communicated, where the high frequency voltage is applied, and further, the direct current voltage is applied on the downstream side than the application position of the high frequency voltage, these dispersion media are charged in different polarities from each other, injected through the passages electrically separated from each other and the nozzle sections and crossed/crashed. Owing to this method, the bonding and a state of being composite of these different kinds of materials can be achieved which have been difficult to realize if the solid-liquid mixed fluid that is a liquid medium in which different kinds of materials is solely mixed is crossed/crashed as the conventional method, a liquid medium containing composite ultra fine particles in which different materials, for example, different kinds of organic polymers or an organic polymer and an inorganic compound like silica are firmly and strongly bonded in nano level can be manufactured.

The liquid medium containing composite ultra fine particles thus manufactured is neither coagulated nor precipitated during long period preservation and has excellent dispersion and stability. The foregoing liquid medium containing composite ultra fine particles can be utilized for manufacturing a gas barrier film and a variety of materials having high functionality, and materials having a physical property of a higher grade.

Moreover, according to the first embodiment of the present invention described above, a manufacturing apparatus by which a liquid medium containing composite ultra fine particles in which different kinds of materials, for example, different kinds of organic polymers or an organic polymer and an inorganic compound like silica are firmly and strongly bonded can be realized.

(Second Embodiment)

Figure 6:
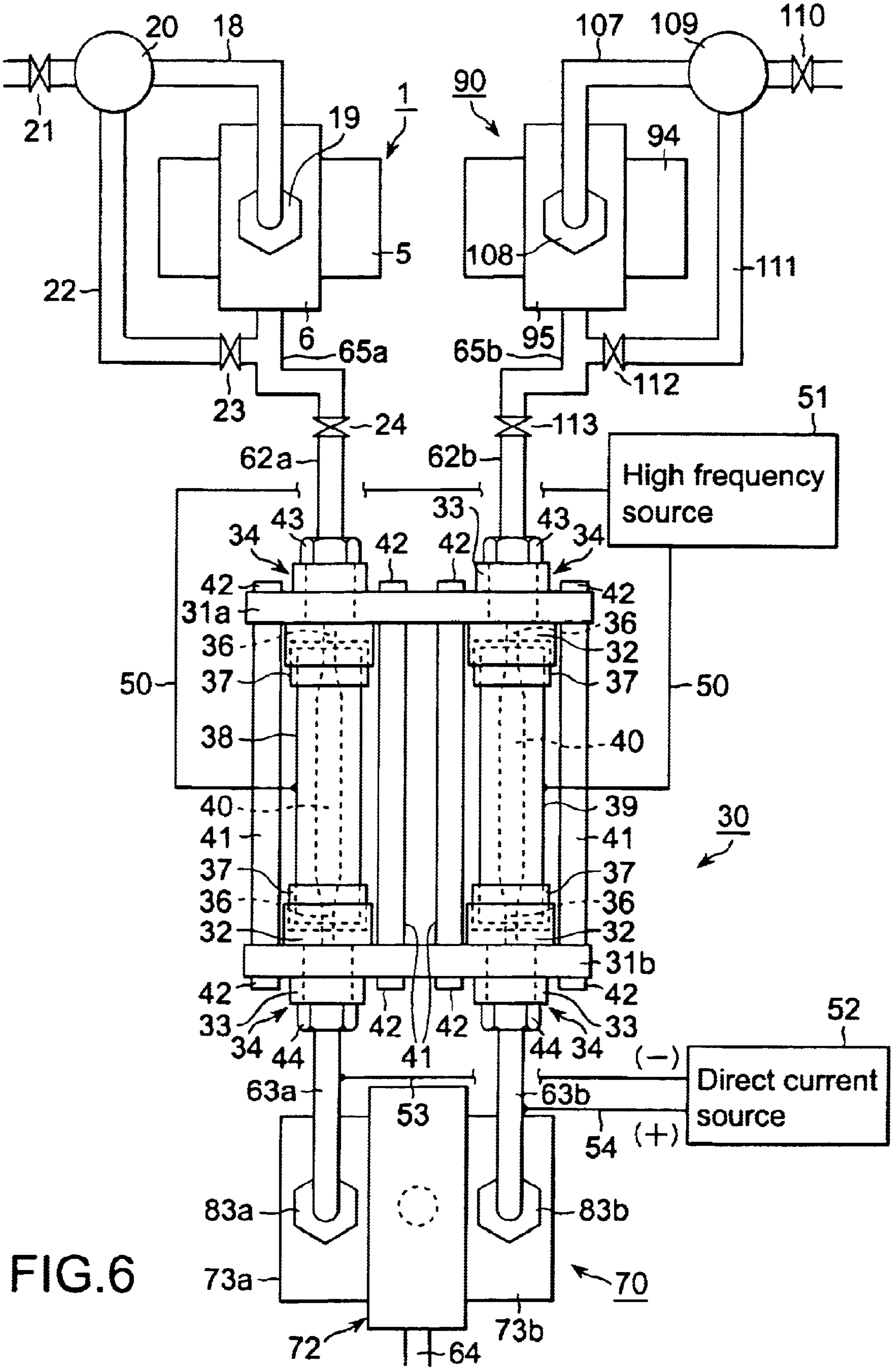
FIG. 6 is a top view schematically showing a manufacturing apparatus of a composite ultrafine particle according to a second embodiment of the present invention.
Figure 7:
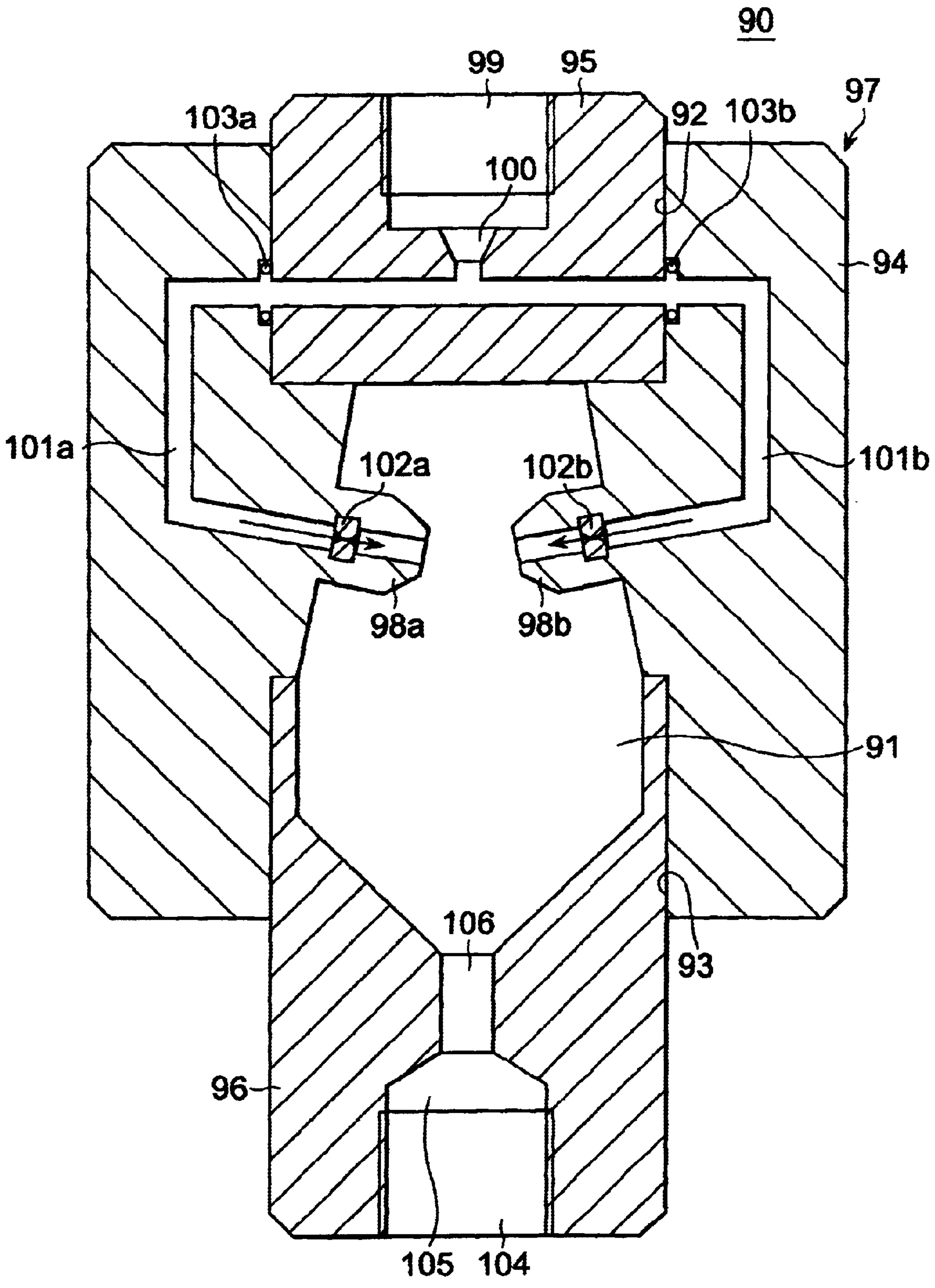
FIG. 7 is a sectional view showing a second dispersion medium preparation mechanism incorporated in FIG. 6.

FIG. 6 is a top view schematically showing a manufacturing apparatus of a composite ultrafine particle according to the second embodiment of the present invention and FIG. 7 is a sectional view showing the second dispersion medium preparation mechanism incorporated in FIG. 6. It should be noted that the same reference signals and numerals are attached to similar members to those in FIG. 1 described above in FIG. 6 and the description is omitted.

A first dispersion medium preparation mechanism (similar structure to the dispersion medium preparation mechanism of FIG. 2 and FIG. 3 described above) 1 and a second dispersion medium preparation mechanism 90 are connected to a charging mechanism 30 through pipes 65*a* and 65*b*, respectively. These pipes 65*a* and 65*b* are made from an insulating material, for example, such as polyimide. The charging mechanism 30 contains two pieces of pipes 63*a* and 63*b*, and connected to an aggregation/bonding mechanism 70 of the ultrafine particles through these pipes 63*a* and 63*b*. The pipes 63*a* and 63*b* are made of an electrically conductive material, for example, such as stainless steel, and a thin film of platinum or gold is coated on the inner surface.

In the first dispersion medium preparation mechanism 1, a solid-liquid mixed fluid in which the desired amount of at least one kind selected from organic polymers, metals and inorganic compounds is mixed is introduced to the main body 8 through the pipe 18.

The second dispersion medium preparation mechanism 90 has, for example, as shown in FIG. 7, a main block 94 having an upper and lower retangular-shaped holes 92 and 93 communicating a cavity portion 91 in quadrilateral pyramid shape, a main body 97 having upper and lower blocks 95 and 96 inserted and fixed in the upper and lower rectangular-shaped holes 92 mid 93. It should be noted that the cavity portion 91 is extended within the lower block 96. The diameters of its upper and lower openings of the cavity portion 91 shaped in a quadrilateral pyramid is smaller than those of the rectangular-shaped holes 92 and 93.

A plurality of, for example, two nozzle sections 98*a* and 98*b* are formed so that these are opposed to the main block 94 located on the intermediate internal surface of the cavity section 91. It is preferable that the openings of the tips (discharging outlet) of these nozzle sections 98*a* and 98*b* have a diameter ranging from a few microns to hundred and a few of tens microns in viewpoint of enhancing an injecting speed of the solid-liquid mixed fluid that is a liquid medium in which the desired amount of at least one kind of organic polymers is mixed.

On the upper block 95, a screw hole 99 is provided from its top surface. In and to this screw hole 99, the pipe described later is screwed, attached and connected. The screw hole 99 is communicated with two pieces of branching passages 101*a* and 101*b* through inverse cone shaped passage 100. The respective branching passages 101*a* and 101*b* are extended from the respective upper section blocks 95 through the main blocks 94 to the tip surfaces of the two nozzle sections 98*a* and 98*b* and the openings are closed on these tip surfaces.

Orifice sections 102*a* and 102*b* for accelerating fluid speed of the solid-liquid mixed fluid which has been introduced into the respective branching passages 101*a* and 101*b* are interposed in the respective branching passages 101*a* and 101*b* located at the base of the nozzle sections 98*a* and 98*b*.

As for the nozzle section, a plurality of, that is, three or more may be employed. The foregoing plurality of nozzle sections are mounted on the main block 94, for example, at the isoperimeric angles on the circular tracing of the plane, for example, in the case where there are two nozzles, the nozzle sections are mounted on the main block 94 at the angles of 180 degrees in the case where there are three nozzles, at the angle of 120 degrees and in the case where there are four nozzles, at the angles of 90 degrees.

Particularly, from the viewpoint of crashing injection flows of the solid-liquid mixed fluids in a good balance and in a higher energy, it is preferable that the nozzle sections of even numbers such as 2, 4, 6 are mounted on the main body.

Although the plurality of nozzle sections may be mounted on the main block 94 so that solid-liquid mixed fluids are injected in a horizontal direction and crossed and crashed each other, these are preferably mounted on the main block 94 so that the solid-liquid fluids are injected in a slanting direction and crossed and crashed each other. If such a configuration is made, it is possible that the crashing region of the injecting flows from the plurality of nozzle sections is widened. Moreover, the nozzle section and the main block can be prevented from damaging by the injecting flows from the nozzles of the opposing side.

It should be noted that 0 rings 103*a* and 103*b* are interposed in the branching passages 101*a* and 101*b* located at the joining line of the upper block 95 and the main block 94, respectively.

On the lower block 96, a screw hole 104 is provided from its lower surface. This screw hole 104 is communicated with the cavity section 91 of the main block 94 through a cone shaped hole 105 and a circular cylindrical hole 106. It should be noted that the diameter of the circular cylindrical hole 106 is made smaller compared with that of the circular cylindrical hole 16 of the above-described first dispersion medium preparation mechanism 1 so that the pressure of the cavity portion 91 can be controlled at the higher level than atmospheric pressure. In the screw hole 104 of the lower block 96, the pipe 65*b* is screwed, attached and connected.

As shown in FIG. 6, a pipe 107 in which the solid-liquid mixed fluid is introduced is screwed into the screw hole 99 of the upper block 95 and attached to it and fixed by a nut 108. A high pressure conveying pump 109 is interposed in the pipe 107. A valve 110 is interposed in the pipe 107 on the upstream side of the high pressure conveying pump 109. A bypass pipe 111 is branched from the pipe 65*b* connected to the side of the second dispersion medium preparation mechanism 90, and its tip end is connected to the high pressure conveying pump 109. Two valves 112 and 113 are interposed in the bypass pipe 111 nearby the branching portion of the bypass pipe 111 and between the portions of the pipe 65*b* on the downstream side of the pipe 65*b*, respectively.

Next, a method of manufacturing a liquid medium containing a composite fine particle according to the second embodiment of the present invention will be described below with reference to a manufacturing apparatus shown in FIG. 6 and FIG. 7 described above.

(Step of Preparing First Dispersion Medium)

First, as shown in FIG. 6 and FIG. 3, the mixed fluid crashing member 17 of the first dispersion medium preparation mechanism 1 is previously positioned so as to be out of the injection flows crossing portion of the solid-liquid mixed fluid of the two nozzle sections 9*a* and 9*b*.

The solid-liquid mixed fluid that is a liquid medium in which the desired amount of at least one material selected from organic polymers, metals and inorganic compounds is mixed into is introduced to the high pressure conveying pump 20 through the piping 18, where the fluid is pressurized to the higher pressure and introduced within the screw hole 10 of the upper block 6. This highly pressurized solid-liquid mixed fluid is introduced to the branching passages 12*a* and 12*b* through the inverse cone shaped passage 11 of the upper block 6, respectively. The solid-liquid mixed fluid flown into these branching passages 12*a* and 12*b* is accelerated in the process of passing through the orifices 13*a* and 13*b*, and injected from the opening portions of the nozzle sections 9*a* and 9*b* within the cavity portion 2 of the main block 5 at a high speed. At this time, since the branching passages 12*a* and 12*b* of the nozzle sections 9*a* and 9*b* disposed opposing to each other are slanting toward the downward, the solid-liquid mixed fluid injected from the openings of the nozzle sections 9*a* and 9*b* are crossed and crashed each other. Therefore, a dispersion medium that is a liquid medium in which its fine particles (or ultrafine particles) are dispersed as well as materials (at least one kind of organic polymers, metals and inorganic compound materials) in the solid-liquid mixed fluid are each other broken to be fine particles.

As the liquid medium, similar ones described in the first embodiment can be employed. These liquid media can be employed in a form of single liquid or mixed liquid corresponding to the kinds or combinations of the materials to be dispersed.

As material(s) of more than one material selected from the organic polymers, metals, inorganic compounds, (a) a mode of employing single organic polymer, metal and inorganic compound, (b) a mode of employing different kinds of organic polymers, and (c) a mode of employing at least one kind of organic polymers and at least one kind selected from metals and inorganic compounds, are listed.

As the organic polymers, metals and inorganic compounds, similar ones described in the first embodiment and ones having similar particle diameter can be employed.

It is preferable that the pressurized pressure of the solid-liquid mixed fluid introduced to the main body 8 of the first dispersion medium preparation mechanism 1 and the injection speed of the solid-liquid mixed fluid injected from the two nozzle sections 9*a* and 9*b* are 500 kg/cm$^2$ or more and 300 m/sec or more, respectively.

As for amount(s) selected from at least one kind of organic polymers, metals and inorganic compounds blended in the liquid medium, it is preferable that (a) in the case where single organic polymer, metal or inorganic compound is employed; 10 to 20% by weight, (b) in the case where different kinds of organic polymers are employed; 10 to 20% by weight, and (c) in the case where at least one kind of organic polymers and at least one kind selected from metals and inorganic compounds are employed; 5 to 15% by weight.

It is preferable to adopt the operation of (1) a mode that materials in solid-liquid mixed fluid are different kinds of organic polymers, (2) a mode that material(s) in solid-liquid mixed fluid are made be a more ultrafine particle and more ultrafinely dispersed, and (3) a mode that solid-liquid mixed fluid in which metals and inorganic compounds difficult to break and organic polymers are mixed is made broken and dispersed, corresponding to the kinds of material and the combinations in the solid-liquid mixed fluid described in the first embodiment at the time of breaking and dispersing operations of the solid-liquid mixed fluid by the dispersion medium preparation mechanism 1.

(Step of Preparing Second Dispersion Medium)

First, the solid-liquid mixed fluid that is a liquid medium in which the desired amount(s) of at least one organic polymers are mixed is introduced to the high pressure conveying pump 109 through the pipe 107 of the second dispersion medium preparation mechanism 90, where the fluid is pressurized to the higher pressure and introduced within the screw hole 99 of the upper block 95. This highly pressurized solid-liquid mixed fluid is introduced to the branching passages 101*a* and 101*b* through the inverse cone shaped passage 100 of the upper block 95, respectively. The solid-liquid mixed fluid flown into these branching passages 101*a* and 101*b* is accelerated in the process of passing through the orifices 102*a* and 102*b*, and injected from the opening portions of the nozzle sections 98*a* and 98*b* within the cavity portion 91 of the main block 94 at a high speed. At the time of such crossing/crashing of the solid-liquid mixed fluid, since the pressure of the cavity portion 91 is controlled at a higher pressure than the atmospheric pressure by narrowing the diameter of the circular cylindrical hole 106 of the lower portion block 96, the fine particles (or ultrafine particles) are dispersed as well as the organic polymer is broken to be fine particles without excessively cutting the molecular chain of the organic polymer in the solid-liquid mixed fluid. As a result, the second dispersion medium that is a liquid medium in which at least one kind of organic polymer ultrafine particles are dispersed is prepared.

As the liquid medium, similar ones described in the first embodiment can be employed. These liquid media can be employed in a form of single liquid or mixed liquid corresponding to the kinds or combinations of the materials to be dispersed.

As at least one organic polymers, (a) a mode of employing single organic polymer, and (b) a mode of employing different kinds of organic polymers, are listed.

As the organic polymers, similar ones described in the first embodiment and ones having similar particle diameter can be employed.

It is preferable that the pressurized pressure of the solid-liquid mixed fluid introduced to the main body 97 of the second dispersion medium preparation mechanism 90 and the injection speed of the solid-liquid mixed fluid injected from the two nozzle sections 98*a* and 98*b* are 500 $kg/cm^2$ or more and 300 m/sec or more, respectively.

As for amount(s) of at least one organic polymers blended in the liquid medium, 10 to 20% by weight is preferable.

It is preferable to adopt the following forms corresponding to the kinds of material and the combinations in the solid-liquid mixed fluid at the time of employing a breaking and dispersing operation mode of the solid-liquid mixed fluid by the second dispersion medium preparation mechanism 90.

Specifically, the valve 113 of the pipe 65*b* shown in FIG. 6 is closed, and the valve 112 of the bypass pipe 111 is opened. Subsequently, the solid-liquid mixed fluid that is a liquid medium in which the desired amount(s) of at least one organic polymers are mixed is introduced to the high pressure conveying pump 109 through the pipe 107, where it is pressurized to be higher pressure, introduced within the screw hole 99 of the upper block 95 and after filling it with the solid-liquid mixed fluid up to the bypass pipe 111 the valve 110 interposed in the pipe 107 is closed. That is to say, the high pressure conveying pump 109 and the main body 97 are made be a closed loop by the bypass pipe 111. After this process, the solid-liquid mixed fluids are injected from the openings of the nozzle sections 98*a* and 98*b* and crossed/crashed each other similarly to the case described above within the cavity portion 91 controlled at a higher pressure than the atmospheric pressure. The operation is repeated such that the solid-liquid mixed fluid after crossing/crashing operations is sent back to the high pressure conveying pump 109 through the bypass pipe 111, where it is enhanced to the desired high pressure, introduced within the screw hole 99 of the upper block 95 of the main body 97, and injected from the openings of the nozzle sections 98*a* and 98*b* and crossed/crashed each other in the cavity portion 91.

In this way, by repeating the operation such that the solid-liquid mixed fluid is crossed/crashed each other, the second dispersion medium in which for example, ultrafine particles of a few hundreds nanometers or less are uniformly dispersed can be prepared as well as at least one kind of organic polymers in the solid-liquid mixed fluid is broken to be ultrafine particles.

(Step of Charging Dispersion Medium)

The highly pressurized first dispersion medium prepared in the first dispersion medium preparation mechanism 1 is introduced to the smaller diameter passage 36 of the joint member 34 of the charging mechanism 30 through the pipe 65*a* and further communicated from the joint member 34 within the passage 40 of the first chamber 38 at high speed. The highly pressurized second dispersion medium prepared in the second dispersion medium preparation mechanism 90 is introduced to the smaller diameter passage 36 of the joint member 34 of the charging mechanism 30 through the pipe 65*b* and further communicated from the joint member 34 within the passage 40 of the second chamber 39 at high speed, and further flows out to the pipes 63*a* and 63*b* located at the downstream of the chambers.

At this time, as shown in FIG. 4, the desired high frequency voltage is supplied from the high frequency source 51 to the circular shaped supplying member 46 through the wiring 50 and the electricity supplying terminal 48, from these circular-shaped electricity supplying member 46, the high frequency voltage is supplied within the first and second chambers 38 and 39, for example, transmitted through the circular-shaped insulating member 47 made of polytetrafluoroethylene. Owing to this, the first and second dispersion media containing ultrafine particles communicating within the first and second chambers 38 and 39 are excited, respectively. At the same time, the direct current is supplied from the direct current source 52 to the pipes 63*a* and 63*b* located on the downstream side than the application position of the high frequency voltage through the wirings 53 and 54. Owing to this, the first dispersion medium communicating within the first chamber 38, and containing ultrafine particles of more than one kind of materials selected from at least one kind of organic polymers, metals and inorganic compounds already excited is negatively charged. Moreover, the second dispersion medium communicating within the second chamber 39, and containing the ultrafine particles of at least one kind of organic polymers already excited is positively charged. Since fluctuation can be made generated in the first and second dispersion media by applying such a high frequency voltage, the sufficient volumes of negative electrification and positive electrification can be applied to the respective first and second dispersion media by subsequent application of the direct current voltage.

It should be noted that in the process in which the dispersion medium is communicated through the passage 40 of the first and second chambers 38 and 39, since the passages are narrowed nearby these outlets, the flows of the respective dispersion media are accelerated.

Moreover, when the high frequency voltage is supplied to the first and second chambers 38 and 39, as shown in FIG. 4, the electricity supplying member 46 is not directly connected to the first and second chambers 38 and 39, by interposing the insulating member 47 between these, the direct current voltage can be prevented from inversely flowing to the high frequency source 51 through the positively and negatively charged dispersion fluid described above and damaging the source 51.

Furthermore, by forming the branching pipes 65*a* and 65*b* for connecting the dispersion medium preparation mechanism 1 and 90 and the charging mechanism 30, respectively, with an insulating material, the direct current voltage can be prevented from flowing into the dispersion medium preparation mechanisms 1 and 90 through the positively and negatively charged dispersion fluids described above.

It is preferable that the high frequency voltage supplied from the high frequency source 51 is set ranging from 500 kHz to 10 MHz and ranging from 20 V to 400 V.

It is preferable that the direct current voltage supplied from the direct current source 52 is set ranging from 0.5 A to 10A, and ranging from 100 V to 5 kV.

(Step of Manufacturing Liquid Medium Containing Composite Ultrafine Particles by Aggregation/Bonding of Ultrafine Particles)

The dispersion media charged in different polarities from each other in the charging mechanism 30 and the pipes 63*a* and 63*b* made of the electrically conductive material are introduced with a high pressure from the pipes 63*a* and 63*b* within the screw holes 76*a* and 76*b* of the first and second blocks 73*a* and 73*b* separated by the main block 72 made of an insulating material of the aggregation/bonding mechanism 70, respectively. Since the first and second blocks 73*a* and 73*b* are electrically separated by the main block 72 made of an insulating material, the first and second highly pressurized dispersion media are introduced to the passages 78*a* and 78*b* as maintaining these electrification volume. These first and second dispersion media are further accelerated in the process of passing through the orifices 79*a* and 79*b* of the respective passages 78*a* and 78*b*, and made injected from the openings of the nozzle sections 75*a* and 75*b* within the rectangular hole 71 of the main block 72. At this time, since the passages 78*a* and 78*b* of the nozzle sections 75*a* and 75*b* disposed opposing to each other are slanting toward the downward, the first and second dispersion media injected from the openings of the nozzle sections 75*a* and 75*b* are efficiently crossed/crashed each other. In such a crashing field, the ultrafine particles in the respective first and second dispersion media electrified in different polarities from each other are aggregated and coupled each other by excitation transfer as well as strongly attracted each other and electrostatically aggregated each other. As a result, a liquid medium containing a large number of composite ultrafine particles comprising different kinds of materials can be manufactured by the procedure that ultrafine particles made from the one or more materials selected from at least one kind of organic polymers, metals, and inorganic compounds which have been dispersed prior to the injection from the nozzle sections 75*a* and 75*b* and ultrafine particulars of at least one organic polymer are coupled each other.

In manufacturing a liquid medium containing composite ultrafine particles described above, when the first and second dispersion media charged by the first and second chambers 38 and 39, the pipes 63*a* and 63*b* and the passages 78*a* and 78*b* of the first and second blocks 73*a* and 73*b* of the aggregation/bonding mechanism 70 made of metal such as stainless steel is communicated, by the respective first and second dispersion media charged from the inner surface side of these members, it is electrolyzed and resolved. From this matter, the resolving made by electrolysis of the charged dispersion media can be prevented by coating a thin film of platinum and gold on inner surfaces of the first and second chambers 38 and 39, the inner surfaces of the pipes 63*a* and 63*b* and the inner surfaces of the passages 78*a* and 78*b* of the first and second blocks 73*a* and 73*b* of the aggregation/bonding mechanism 70.

Up to this point, as described above, according to the second embodiment of the present invention, the first and second dispersion media are introduced to the first and second chambers and communicated, where the high frequency voltage is applied, and further, the direct current voltage is applied on the downstream side than the application position of the high frequency voltage, these first and second dispersion media are charged in different polarities from each other, made injected through the passages electrically separated from each other and the nozzle sections and crossed/crashed. Owing to this method, the bonding and making a state of being composite of these different kinds of materials can be achieved which have been difficult to realize if the solid-liquid mixed fluid that is a liquid medium into which different kinds of materials are solely mixed is crossed/crashed as the conventional method, a liquid medium containing composite ultra fine particles in which different materials, for example, different kinds of organic polymers or an organic polymer and an inorganic compound like silica are firmly and strongly bonded} in nano level can be manufactured.

Moreover, according to the second embodiment of the present invention, since the first and second dispersion media are prepared by employing the first and second dispersion medium preparation mechanisms 1 and 90, it is possible to make ultrafine particles and perform ultra dispersion suitable for the used material. Concretely, in the case where a composite ultrafine particle comprising inorganic compound such as silica which is difficult to be ultrafine particle and an organic polymer is manufactured, as shown in FIG. 2, by employing the first dispersion medium preparation mechanism 1 that the mixed fluid crashing member 17 has been inserted in the injection flows crossing/crashing region, the breakage of the inorganic compound is efficiently made, the first dispersion medium in which an inorganic compound ultrafine particle is ultrafinely dispersed can be prepared, and the second dispersion medium in which an organic polymer ultrafine particle having an appropriate molecular chain by the second dispersion medium preparation mechanism 90 can be prepared. Therefore, by passing these first and second dispersion media via the above-described charging mechanism 30 for the dispersion medium and the aggregation/bonding mechanism 70 of the ultrafine particle, a liquid medium containing composite ultrafine particles by bonding and integrating inorganic compound ultrafine particle such as silica on the order of nano level to the organic polymer ultrafine particle can be manufactured.

The liquid medium containing composite ultra fine particles thus manufactured is neither coagulated nor precipitated during long period preservation and has excellent dispersion and stability. The foregoing liquid medium containing composite ultrafine particles can be utilized for manufacturing a gas barrier film and a variety of materials having a high functionality and materials having a physical property of a high grade.

Moreover, according to the second embodiment of the present invention described above, a manufacturing apparatus by which a liquid medium containing composite ultrafine particles in which different kinds of materials, for example, different kinds of organic polymers or an organic polymer and an inorganic compound like silica are firmly and strongly bonded can be realized.

Hereinafter, examples of the present invention will be described in detail with reference to Figures described above.

EXAMPLE 1

(First Step)

The first solid-liquid mixed fluid was prepared by blending polylactate (raw dicomposition resin) to dimethyl sulfoxide so that its concentration becomes 10% by weight.

Moreover, the second solid-liquid mixed fluid was prepared by blending polyvinyl alcohol to dimethyl sulfoxide so that its concentration becomes 10% by weight.

(Second Step)

Dimethyl sulfoxide is supplied to the dispersion medium preparation mechanism 1 (form that the mixed fluid crashing member 17 is not inserted into the injection flows crossing/crashing region of the cavity portion) as shown in FIG. 1 and FIG. 3 and the same dimethyl sulfoxide fulfilled within the system. Subsequently, the first solid-liquid mixed fluid is introduced into the dispersion medium preparation mechanism 1, five passes of the dispersion operations were performed until the first solid-liquid mixed fluid fulfilled with the system under the following conditions.

<Dispersion Conditions>

Pressure for introducing solid-liquid mixed fluid to dispersion medium preparation mechanism main body; 2000 Kg/cm$^2$, and Diameter of openings of two nozzle sections; 100 $\mu$m.

(Third Step)

While the second solid-liquid mixed fluid is gradually introduced to the dispersion preparation mechanism 1 in which the first solid-liquid mixed fluid is contained, the dispersion medium in which the ultrafine particles of polylactate and ultrafine particles of polyvinyl alcohol were uniformly dispersed was prepared by performing five passes of the dispersion operations until the first solid-liquid mixed fluid and the second solid-liquid mixed fluid are resolved and dispersed each other in the system under the conditions.

(Fourth Step)

The dispersion medium is communicated within the first and second chambers 38 and 39 of the charging mechanism 30 through the pipe 61, the branching pipes 62*a* and 62*b* shown in FIG. 1 with a high pressure, and further made flown out to the pipes 63*a* and 63*b* located on the downstream side. At this time, the high frequency voltage under the following conditions is supplied from the high frequency source 51 to the circular shaped supplying member 46 through the wiring 50 and the electricity supplying terminal 48 as shown in FIG. 4, from these circular-shaped electricity supplying members 46, the high frequency voltage is supplied within the first and second chambers 38 and 39 transmitted through the circular-shaped insulating member 47 made of, for example, polytetrafluoroethylene. At the same time, the direct current is supplied from the direct current source 52 to the pipes 63*a* and 63*b* located on the downstream side than the application position of the high frequency voltage through the wirings 53 and 54. Owing to this, the dispersion medium communicating within the first and second chambers 38 and 39 and containing ultrafine particles are excited, respectively. Owing to this, the dispersion medium communicating within the first chamber 38, and containing ultrafine particles already excited is negatively charged. Moreover, the dispersion medium communicating within the second chamber 39, and containing the ultrafine particles already excited is positively charged.

<Electrification Conditions>

High frequency voltage; 5 MHz, 500 V, and

Direct current voltage; 3 kV, 3.5 kW.

(Fifth Step)

Dimethyl sulfoxide containing composite fine particles in which a large number of composite fine particles comprising polylactate and polyvinyl alcohol are dispersed into dimethyl sulfioxide was obtained by introducing the respective dispersion media electrified in different polarities from each other within the pipes 63*a* and 63*b* into the aggregation/bonding mechanism 70 and by injecting with a high pressure within the cavity portion 71 from the openings of the two nozzle sections 75*a* and 75*b* whose diameter of the openings electrically separated from each other is 10 $\mu$m and crossing/crashing.

Even when the obtained dimethyl sulfoxide containing a composite fine particle was stored for 6 months, the separation of the respective fine particles constituting a large number of composite fine particles and precipitation and aggregation/condensation were not recognized.

A composite film having the thickness of 10 $\mu$m and made of polylactate and polyvinyl alcohol and made of polylactate and polyvinyl alcohol was formed by print coating dimethyl sulfoxide containing a composite fine particle of Example 1 on the silicon sheet, and drying it.

Comparative Example 1

Dimethyl sulfoxide containing polylactate and polyvinyl alcohol was prepared by agitating and mixing at the ratio of 1:1 of the first solid-liquid mixed fluid containing polylactate prepared in the first step of the Example 1 and the second solid-liquid mixed fluid containing polyvinyl alcohol. Subsequently, a composite film was formed of 10 $\mu$m by print coating this solution on the silicon sheet an drying it.

Comparative Example 2

The dispersion medium in which the ultrafine particles of polylactate prepared in the third step of the Example 1 and the ultrafine particles of polyvinyl alcohol are uniformly dispersed was prepared. A composite film made of polylactate and polyvinyl alcohol having a thickness of 10 $\mu$m was formed by print coating this dispersion medium on the silicon sheet and drying it.

The condition of the manufactured film, the film strength, extensibility, and appearance of the film on the composite film obtained by the Example 1 and Comparative Examples 1 and 2 were examined. These results are shown in the following Table 1. It should be noted that the film strength is a strength when the film peeled off from the silicon sheet was pooled and the extensibility is referred to an averagely thinning degree of the film thickness in a state where the film was heated at about 100° C. and pooled in the longitudinal and transverse directions.

TABLE 1

| | Manufactured film condition | Film strength and extensibility | Others |
|---|---|---|---|
| Example 1 | Manufactured well done | Fairly well on both of film strength and extensibility | Transparent and uniformly coloring over the entire film |
| Comparative example 1 | Impossible to be manufactured | None on both of film strength and extensibility | The film was completely damaged at the stage of drying |
| Comparative example 2 | Possible to be manufactured | Fairly well on film strength, none on extensibility | Ununiformly coloring spots exist here and there |

As is apparent from the Table 1, it is understood that a composite film made of polylactate and polyvinyl alcohol which is excellent at the strength and the extensibility, and is transparent, and colored uniformly from the appearance can be formed by print-coating dimethyl sulfoxide containing a composite fine particle obtained by Example 1 on the silicon sheet and drying it.

EXAMPLE 2

(First Step)

The first solid-liquid mixed fluid whose concentration of the silicon oxide is 12% by weight was prepared by dispersing an aggregate of silicon oxide powder (average particle diameter of the primary particle; 7 nm) in the pure water. Subsequently, the first dispersion medium in which the silicon oxide ultrafine particles are dispersed was prepared by introducing the solid-liquid mixed fluid into the first dispersion medium preparation mechanism 1 (mixed fluid crashing member 17 was inserted in the injection flows crossing/crashing region of the cavity portion) shown in FIG. 6 and FIG. 2 described above, and performing 7 passes of the breaking and dispersing operation of injecting the first solid-liquid mixed fluid from the two nozzle sections 9*a* and 9*b* and crossing/crashing under the following conditions.

<Breaking and Dispersing Conditions>

Pressure for introducing the first solid-liquid mixed fluid to the first dispersion medium preparation mechanism; 1500 Kg/cm$^2$, Diameter of the openings of the two nozzle sections; 100 μm, Acceleration of the solid-liquid mixed fluid after passing through orifice section; 250 m/sec, Mixed fluid crashing member; a sintered diamond whose sizes of three sides are 8 mm, 8 mm and 8 mm forms a shape of an equilateral triangle pole.

(Second Step)

The second solid-liquid mixed fluid whose polyvinyl alcohol concentration is 12% by weight was prepared by resolving and dispersing polyvinyl alcohol in the pure water. Subsequently, the second dispersion medium in which polyvinyl alcohol ultrafine particles are dispersed was prepared by introducing the first solid-liquid mixed fluid to the second dispersion medium preparation mechanism 90 shown in FIG. 6 and FIG. 7 described above and performing three passes of the dispersing operation for injecting the second solid-liquid mixed fluid from the two nozzle sections 98*a* and 98*b* and crossing/crashing under the following conditions.

<Breaking and Dispersing Conditions>

Pressure for introducing the second solid-liquid mixed fluid to the first dispersion medium preparation mechanism; 1500 Kg/cm$^2$, Diameter of the openings of the two nozzle sections; 150 μm, (Third Step)

The first and second dispersion media are communicated within the first and second chambers 38 and 39 of the charging mechanism 30 through the pipes 65*a* and 65*b* with a high pressure, and further made flown out to the pipes 63*a* and 63*b* located on the downstream side than these chambers. At this time, the high frequency voltage under the following conditions is supplied from the high frequency source 51 to the circular shaped electricity supplying member 46 through the wiring 50 and the electricity supplying terminal 48 as shown in FIG. 4, from these circular-shaped electricity supplying members 46, the high frequency voltage is supplied within the first and second chambers 38 and 39 transmitted through the circular-shaped insulating member 47 made of, for example, polytetrafluoroethylene. At the same time, the direct current is supplied from the direct current source 52 to the pipes 63*a* and 63*b* located on the downstream side than the application position of the high frequency voltage through the wirings 53 and 54. Owing to this, the dispersion medium communicating within the first chamber 38 and containing silicon oxide ultrafine particles already excited is negatively charged. Moreover, the dispersion medium communicating within the second chamber 39 and containing polyvinyl alcohol ultrafine particles already excited is positively charged.

<Electrification Conditions>

High frequency voltage; 200 V, 2 MHz, and

Direct current voltage; 2 kV, 2.0 kW.

(Fourth Step)

The water containing a composite fine particle in which a large number of the composite fine particles multiplexing silicon oxide ultrafine particles and polyvinyl alcohol ultrafine particles (mixture weight ratio 3:7) are dispersed in water was obtained by introducing the first and second dispersion media electrified in different polarities from each other within the pipes 63*a* and 63*b* to the aggregation/bonding mechanism 70 and injecting with a high pressure within the cavity portion 71 from the openings of the two nozzle sections 75*a* and 75*b* of 100 μm of the diameter of the openings and crossing/crashing each other.

EXAMPLE 3

A water containing composite fine particles in which a large number of composite fine particles multiplexing silicon oxide ultrafine particles and polyvinyl alcohol ultrafine particles (mixture weight ratio 3:7) were dispersed in water was obtained by the similar method with Example 2 except for the electrification conditions in the third step of Example 2 being made as high frequency voltage; 400 V, 4 MHz, direct current; 5 kV, 3.5 kW.

Comparative Example 3

The water containing ultrafine particles in which silicon oxide ultrafine particles and polyvinyl alcohol ultrafine particles exist at the weight ratio of 3:7 by introducing the first and second dispersion media prepared in Example 2 to the aggregation/bonding mechanism 70 through pipes 65*a* and 65*b*, the first and second chambers 38 and 39 and the pipes 63*a* and 63*b* and injecting with a high pressure from the openings of the two nozzle sections 75*a* and 75*b* of 100 μm of the diameter of the openings and crossing/crashing each other. It should be noted that the application of high frequency voltage to the first and second dispersion media communicating within the respective first and second chambers 38 and 39 and the application of direct current voltage to the first and second dispersion media flown to the pipes 63*a* and 63*b* were not performed.

Three kinds of gas barrier character high quality papers were manufactured by coating the water containing ultrafine particles of Examples 2, 3 and Comparative Example 3 which were obtained on the anchor coat of the thickness of 5 μm of the surface of the high quality paper respectively by the roller coater method and by drying it and forming a gas barrier layer in the thickness of 10 μm.

Oxygen permeability volume and water vapor permeability volume were measured on the gas barrier character high quality papers of Examples 2, 3 and Comparative Example 3. It should be noted that as for oxygen permeability, sample of 10 cm of the diameter cut out from the laminate film was measured using Gasperm (product name; Nippon Spectrum, Co., Ltd.) under the conditions of being pressurized at 5 kg/cm$^2$ in the oxygen concentration of 100%, at 25° C., and at 65% R.H. Moreover, as for water vapor permeability, the sample of 10 cm of the diameter cut out from the laminated film was measured using L80-4000 type (product name; Dr. lyssy, Inc., Swiss) under the conditions of 40° C., 90% R.H according to JIS K129. The results are indicated in the following Table 2.

TABLE 2

| | High frequency voltage | Direct current voltage | Oxygen permeability ($cc/m^2 \cdot 24$ hr) | Water vapor permeability ($g/m^2 \cdot 24$ hr) |
|---|---|---|---|---|
| Example 2 | 200 V 2 MHz | 2 kV 2.0 kW | 0.5–7.0 | 2.0–3.0 |
| Example 3 | 400 V 4 MHz | 5 kV 3.5 kW | 0.5 or less | 1.0 or less |
| Comparative example 3 | — | — | 5.0–7.0 | 130–150 |

As is apparent from the Table 2, it is understood that the gas barrier character high quality papers of Examples 2 and 3 has excellent oxygen blocking character and water vapor blocking character compared with those of the gas barrier character high quality paper of Comparative Example 3 without applying the high frequency voltage and direct current voltage to the first and second dispersion media but using the water containing ultrafine particles in which silicon oxide ultrafine particles and polyvinyl alcohol ultrafine particles obtained by crossing/crashing in the aggregation/bonding mechanism exist.

EXAMPLE 4

(First Step)

The first solid-liquid mixed fluid whose concentration of the silicon oxide is 12% by weight and polytetrafluoroethylene (PTFE) concentration is 1% by weight was prepared by dispersing an aggregate of silicon oxide powder (average particle diameter of the primary particle; 7 nm) and PTFE fine particles in the pure water. Subsequently, the first dispersion medium in which the silicon oxide ultrafine particles and PTFE ultrafine particles were dispersed was prepared by introducing the solid-liquid mixed fluid into the first dispersion medium preparation mechanism 1 (mixed fluid crashing member 17 was inserted in the injection flows crossing/crashing region of the cavity portion) shown in FIG. 6 and FIG. 2 described above, and performing 7 passes of the breaking and dispersing operation of injecting the first solid-liquid mixed fluid from the two nozzle sections 9*a* and 9*b* and crossing/crashing under the following conditions.

<Breaking and Dispersing Conditions>

Pressure for introducing the first solid-liquid mixed fluid to the first dispersion medium preparation mechanism; 1500 $Kg/cm^2$, Diameter of the openings of the two nozzle sections; 100 $\mu$m, Acceleration of the solid-liquid mixed fluid after passing through orifice section; 250 m/sec, Mixed fluid crashing member; a sintered diamond whose sizes of three sides are 8 mm, 8 mm and 8 mm forms a shape of an equilateral triangle pole.

(Second Step)

The second solid-liquid mixed fluid whose polyvinyl alcohol concentration was 12% by weight was prepared by resolving and dispersing polyvinyl alcohol in the pure water. Subsequently, the second dispersion medium in which polyvinyl alcohol ultrafine particles were dispersed was prepared by introducing the first solid-liquid mixed fluid to the second dispersion medium preparation mechanism 90 shown in FIG. 6 and FIG. 7 described above and performing three passes of the dispersing operation for injecting the second solid-liquid mixed fluid from the two nozzle sections 98*a* and 98*b* and crossing/crashing under the following conditions.

<Breaking and Dispersing Conditions>

Pressure for introducing the second solid-liquid mixed fluid to the first dispersion medium preparation mechanism; 1500 $Kg/cm^2$, Diameter of the openings of the two nozzle sections; 150 $\mu$m, (Third Step)

The first and second dispersion media are communicated within the first and second chambers 38 and 39 of the charging mechanism 30 through the pipes 65*a* and 65*b* shown in FIG. 6 with a high pressure, and further made flown out to the pipes 63*a* and 63*b* located on the downstream side than these chambers. At this time, the high frequency voltage under the following conditions is supplied from the high frequency source 51 to the circular shaped electricity supplying member 46 through the wiring 50 and the electricity supplying terminal 48 as shown in FIG. 4, from these circular-shaped electricity supplying members 46, the high frequency voltage is supplied within the first and second chambers 38 and 39 transmitted through the circular-shaped insulating member 47 made of, for example, polytetrafluoroethylene. At the same time, the direct current is supplied from the direct current source 52 to the pipes 63*a* and 63*b* located on the downstream side than the application position of the high frequency voltage through the wirings 53 and 54. Owing to this, the dispersion medium communicating within the first chamber 38 and containing silicon oxide ultrafine particles already excited is negatively charged. Moreover, the dispersion medium communicating within the second chamber 39 and containing polyvinyl alcohol ultrafine particles already excited is positively charged.

<Electrification Conditions>

High frequency voltage; 200 V, 2 MHz, and

Direct current voltage; 2 kV, 2.0 kW.

(Fourth Step)

The water containing a composite fine particle in which a large number of the composite fine particles multiplexing PTFE ultrafine particles, silicon oxide ultrafine particles and polyvinyl alcohol ultrafine particles (mixture weight ratio 9:27:64) are dispersed in water was obtained by introducing the first and second dispersion media electrified in different polarities from each other within the pipes 63*a* and 63*b* to the aggregation/bonding mechanism 70 and injecting with a high pressure within the cavity portion 71 from the openings of the two nozzle sections 75*a* and 75*b* of 100 $\mu$m of the diameter of the openings and crossing/crashing each other.

EXAMPLE 5

The water containing composite fine particles in which a large number of composite fine particles multiplexing PTFE ultrafine particles, silicon oxide ultrafine particles and polyvinyl alcohol ultrafine particles (mixture weight ratio 9:27:64) are dispersed in water was obtained by the similar method with Example 2 except for the electrification conditions in the third step of Example 3 being made as high frequency voltage; 400 V, 4 MHz, direct current; 5 kV, 3.5 kW.

Comparative Example 4

The water containing ultrafine particles in which PTFE ultrafine particles, silicon oxide ultrafine particles and polyvinyl alcohol ultrafine particles exist at the weight ratio of 9:27:64 by introducing the first and second dispersion media prepared in Example 4 to the aggregation/bonding mechanism 70 through pipes 65*a* and 65*b*, the first and second chambers 38 and 39 and the pipes 63*a* and 63*b* and injecting with a high pressure from the openings of the two nozzle sections 75*a* and 75*b* of 100 μm of the diameter of the openings and crossing/crashing each other. It should be noted that the application of high frequency voltage to the first and second dispersion media communicating within the respective first and second chambers 38 and 39 and the application of direct current voltage to the first and second dispersion media flown to the pipes 63*a* and 63*b* were not performed.

Three kinds of gas barrier character high quality papers were manufactured by coating the water containing ultrafine particles of Examples 4, 5 and Comparative Example 4 which were obtained on the anchor coat of the thickness of 5 μm of the surface of the high quality paper respectively by the roller coater method and by drying it and forming a gas barrier layer in the thickness of 10 μm.

Oxygen permeability volume and water vapor permeability volume were measured on the gas barrier character high quality papers of Examples 4, 5 and Comparative Example 4 by the similar method with that of Example 2. The results are indicated in the following Table 3.

TABLE 3

| | High frequency voltage | Direct current voltage | Oxygen permeability ($cc/m^2 \cdot 24$ hr) | Water vapor permeability ($g/m^2 \cdot 24$ hr) |
|---|---|---|---|---|
| Example 4 | 200 V<br>2 MHz | 2 kV<br>2.0 kW | 1.0–2.0 | 1.0–2.0 |
| Example 5 | 400 V<br>4 MHz | 5 kV<br>3.5 kW | 0.5 or less | 0.1–0.25 |
| Comparative example 4 | — | — | 6.0–8.0 | 100–120 |

As is apparent from the Table 3, it is understood that the gas barrier character high quality papers of Examples 4 and 5 has excellent oxygen blocking character and water vapor blocking character compared with those of the gas barrier character high quality paper of Comparative Example 4 without applying the high frequency voltage and direct current voltage to the first and second dispersion media but using the water containing ultrafine particles in which PTFE ultrafine particles, silicon oxide ultrafine particles and polyvinyl alcohol ultrafine particles obtained by crossing/crashing in the aggregation/bonding mechanism exist.

It is understood that the gas barrier character high quality papers of Examples 4 and 5 have a further more excellent oxygen blocking character and water vapor blocking character compared with those of the gas barrier character high quality paper of Examples 2 and 3 without applying the high frequency voltage and direct current voltage to the first and second dispersion media but using the water containing ultrafine particles in which silicon oxide ultrafine particles and polyvinyl alcohol ultrafine particles obtained by crossing/crashing in the aggregation/bonding mechanism exist. Particularly, the gas barrier character high quality paper of Example 5 has excellent water vapor blocking character comparing to an aluminum foil in the thickness of 7 μm.

Up to this point, as described above in detail, according to the present invention, a method in which a liquid medium containing composite ultrafine particles that different kinds of organic polymers suitable for manufacturing materials having a high functionality and materials having a high quality physical property are uniformly aggregated and composite ultrafine particles that at least one of ultrafine particles selected from organic polymers, metals and inorganic compounds are uniformly dispersed and coupled can be easily manufactured and its manufacturing apparatus can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A apparatus for manufacturing a liquid medium containing composite ultrafine particles, comprising:

a first chamber having an inlet and outlet in which dispersion medium introduced and removed, and said dispersion medium consisting a liquid medium in which ultrafine particles of different materials from each other are dispersed;

a second chamber having an inlet and outlet which said dispersion medium is introduced and removed;

an aggregating/bonding means having two nozzle sections electrically separated each other for introducing said dispersion medium communicating within said first and second chambers, injecting these dispersion media and crossing/crashing each other; a high frequency source for applying a high frequency voltage to said dispersion medium communicating within said first and second chambers through an insulating member that high frequency is capable of being transmitted; and a direct current source connected to a member located up to said nozzle section on the downstream side in a flow direction of said dispersion medium than the application position of said high frequency voltage.

2. The apparatus according to claim 1, wherein said first and second chambers are made of an electrically conductive material, and said high frequency source is connected to said first and second chambers through an insulating member that high frequency voltage is capable of being transmitted.

3. The apparatus according to claim 1, wherein said aggregating/bonding means comprises: an insulative supporting main body having a hole opened on both sides; two block-like members mounted on both side of this supporting main body so as to seal said hole, respectively and comprising an electrically conductive material having passages connected to said first and second chambers, respectively; and two nozzle sections formed on these block-like members so as to communicate with said each passage for injecting said dispersion medium within said hole and crossing/crashing each other.

4. The apparatus according to claim 3, wherein said first and second chambers are made of an electrically conductive material and a film made of platinum or gold is formed on inner surface of said first and second chambers and each passage of said block-like members.

5. The apparatus according to claim 3, wherein said direct current source is connected to said two block-like members of said aggregating/bonding means.

6. The apparatus according to claim 1, wherein dispersion medium preparation means is further applied on upstream side of said first and second chambers, and said dispersion medium preparation means has a cavity portion in it, and comprises: a main body having a plurality of passages through which a solid-liquid mixed fluid that is a liquid medium in which different materials are mixed are introduced with a high pressure; a plurality of nozzle sections formed on this main body so as to communicate with said each passage and for injecting said solid-liquid mixed fluid within said cavity portion and crossing/crashing each other; an exhausting section provided on said main body so as to communicate with said cavity portion; a mixed fluid crashing member freely separably and contactably inserted to an injection flows crossing portion of said plurality of solid-liquid mixed fluid injecting from said each nozzle section to said main body, a mixed fluid crashing member whose at least surface crashed by said liquid medium is made of substance having a higher rigidity than said materials.

7. The apparatus according to claim 6, wherein said nozzle sections are mounted on said main body so as to inject said solid-liquid mixed fluid in a slanting direction and crossing/crashing each other.

8. The apparatus according to claim 6, wherein said mixed fluid crashing member is made of metal base material whose surface is electrodeposited with diamond particles.

9. The apparatus according to claim 6, wherein said mixed fluid crashing member is made of a sintered diamond.

10. The apparatus according to claim 6, wherein said dispersion medium preparation means has two nozzle sections and said mixed fluid crashing member is in a triangle pole shape having two surfaces against which solid-liquid mixed fluid injected from said two nozzle sections is crashed.

11. The apparatus according to claim 1, wherein said first and second chambers are made of an electrically conductive material and said direct current source is connected to said first and second chamber portions on the downstream side in a flow direction of said dispersion medium than the application position of said high frequency voltage.

12. The apparatus according to claim 1, wherein said direct current source is connected to a pipe for joining said first and second chambers and said aggregating/bonding means.

13. A apparatus for manufacturing a liquid medium containing composite ultrafine particles, comprising:

first dispersion medium preparation means for preparing a first dispersion medium that is a liquid medium in which ultrafine particles comprising least one material selected from organic polymers, metals inorganic materials are dispersed; second dispersion medium preparation means for preparing a second dispersion medium that liquid medium in which at least one of organic polymer ultrafine particles is dispersed;

a first chamber having an inlet in which said pressurized first dispersion medium is introduced from said first dispersion medium preparation means, and an outlet;

a second chamber having an inlet in which pressurized second dispersion medium is introduced from said second dispersion medium preparation means, and an outlet;

an aggregating/bonding means having two nozzle sections electrically separated from each other introducing said first and second dispersion media communicating with said first and second chambers respectively, and injecting these dispersion media and crossing/crashing each other;

a high frequency source for applying a high frequency voltage to each dispersion medium communicating within said first and second chambers through an insulating member through which high frequency is capable of being transmitted; and a direct current source connected to a member located up nozzle section on the downstream side in a flow direction of said first and second dispersion media than the application position of said high frequency voltage.

14. The apparatus according to claim 13, wherein said first dispersion medium preparation means has a cavity portion in it, and comprises: a main body having a plurality of passages through which a solid-liquid mixed fluid that is a liquid medium in which one material selected from organic polymers, metals and inorganic compounds are dispersed are introduced with a high pressure, a plurality of nozzle sections formed on this main body so as to communicate with said each passage and for injecting said solid-liquid mixed fluid within said cavity portion and crossing/crashing each other; an exhausting section provided on said main body so as to communicate with said cavity portion; and a mixed fluid crashing member freely separably and contactably inserted to an injection flows crossing portion of said plurality of solid-liquid mixed fluid injecting from said each nozzle section to said main body, and a mixed fluid crashing member whose at least surface crashed by said liquid medium is made of substance having a higher rigidity than said materials.

15. The apparatus according to claim 14, wherein said nozzle sections are mounted on said main body so as to inject said solid-liquid mixed fluid in a slanting direction and crossing/crashing each other.

16. The apparatus according to claim 14, wherein said mixed fluid crashing member is made of metal base material whose surface is electrodeposited with diamond particles.

17. The apparatus according to claim 14, wherein said mixed fluid crashing member is made of a sintered diamond.

18. The apparatus according to claim 14, wherein said first dispersion medium preparation means has two nozzle sections and said mixed fluid crashing member is in a triangle pole shape having two surfaces against which solid-liquid mixed fluid injected from said two nozzle sections is crashed.

19. The apparatus according to claim 13, wherein said second dispersion medium preparation means has a cavity portion and comprises: a main body having a plurality of passages through which a solid-liquid mixed fluid that is liquid medium in which at least one organic polymer mixed introduced with a high pressure; a plurality of nozzle sections formed on this main body so as communicate with said each passage and injecting said within said cavity portion and solid-liquid mixed fluid crossing/crashing each other; and an exhausting section provided on said main body so as to communicate with said cavity portion and also serving as a pressure controller within said cavity portion.

20. The apparatus according to claim 13, wherein said first and second chambers are made of an electrically conductive material, and said high frequency source is connected to said first and second chambers through an insulating member that high frequency voltage is capable of being transmitted.

21. The apparatus according to claim 13, wherein said aggregating/bonding means comprises: an insulative supporting main body having a hole opened on both sides; two block-like members mounted on both side of this supporting main body so as to seal said hole, respectively and comprising an electrically conductive material having passages connected to said first and second chambers, respectively;

and two nozzle sections formed on these block-like members so as to communicate with said each passage for injecting said dispersion medium within said hole and crossing/crashing each other.

22. The apparatus according to claim 21, wherein said first and second chambers are made of an electrically conductive material and a film made of platinum or gold is formed on inner surface of said first and second chambers and each passage of said block-like members.

23. The apparatus according to claim 21, wherein said direct current source is connected to said two block-like members of said aggregating/bonding means.

24. The apparatus according to claim 13, wherein said first and second chambers are made of an electrically conductive material and said direct current source is connected to said first and second chamber portions on the downstream side in a flow direction of said first and second dispersion media than the application position of said high frequency voltage.

25. The apparatus according to claim 13, wherein said direct current source is connected to a pipe for joining said first and second chambers and said aggregating/bonding means.

* * * * *